United States Patent [19]
Xu

[11] Patent Number: 5,992,753
[45] Date of Patent: Nov. 30, 1999

[54] HAND HELD DATAFORM READER UTILIZING BINARIZATION PROCESS FOR DATAFORM AND SIGNATURE AREA CAPTURE

[75] Inventor: Jianhua Xu, Bothell, Wash.

[73] Assignee: Metanetics Corporation, Fort Myers, Fla.

[21] Appl. No.: 08/961,096

[22] Filed: Oct. 30, 1997

[51] Int. Cl.[6] .................................................. G06K 7/10
[52] U.S. Cl. ........................... 235/472.01; 235/462.25; 235/462.1
[58] Field of Search ........................ 235/462.01, 462.08, 235/462.1, 462.09, 472.01, 472.02, 472.03, 462.25–462.28

[56] References Cited

U.S. PATENT DOCUMENTS

| | | | |
|---|---|---|---|
| 3,978,317 | 8/1976 | Yamaguchi et al. ..................... | 235/462 |
| 4,210,802 | 7/1980 | Sakai ....................................... | 235/462 |
| 4,251,798 | 2/1981 | Swartz et al. ........................... | 235/462 |
| 4,409,470 | 10/1983 | Sheppard et al. ....................... | 235/462 |
| 4,734,566 | 3/1988 | Senda et al. ............................ | 235/462 |
| 4,766,300 | 8/1988 | Chadima, Jr. et al. ................. | 235/462 |
| 4,835,615 | 5/1989 | Taniguchi et al. ...................... | 235/462 |
| 4,877,949 | 10/1989 | Danielson et al. ...................... | 235/462 |
| 5,010,580 | 4/1991 | Vincent et al. ........................... | 382/17 |
| 5,019,699 | 5/1991 | Koenck .................................... | 235/472 |
| 5,262,871 | 11/1993 | Wilder et al. ....................... | 358/213.11 |
| 5,349,172 | 9/1994 | Roustaei ................................. | 235/472 |
| 5,354,977 | 10/1994 | Roustaei ................................. | 235/472 |
| 5,414,251 | 5/1995 | Durbin .................................... | 235/462 |
| 5,793,033 | 8/1998 | Feng et al. .......................... | 235/472.01 |

OTHER PUBLICATIONS

Title: *Metanetics Corporation IR–2000 Hand Held Image Reader User's Guide.* To the best of Applicant's knowledge, this publication was published more than one year prior to the filing date of the above-named patent application.

*Primary Examiner*—Thien Minh Le
*Attorney, Agent, or Firm*—Watts, Hoffman, Fisher & Heinke Co.

[57] ABSTRACT

A portable data collection device having an imaging based dataform reader utilizing a binarization process to identify an imaged dataform or signature area with a target image area. An imaging assembly is provided that includes a board camera having black and white circuitry and generates a composite video signal representing an image of a target area of the imaging assembly when actuated. The imaging assembly includes a two dimensional photosensor array. The imaging assembly is selectively actuatable with a first trigger for reading a target dataform in the imaging assembly's target area and actuatable with a second trigger for capturing a image of the target object in the target area. When the device is operated in a dataform reading mode or in a signature area capture mode, binarization circuitry is provided that binarizes gray scale values generated from the composite video signal and examines the binary values to identify the imaged dataform or signature area. When operating in the signature area capture mode, the binarized data corresponding to the signature area is subject to data compression before being output. When operating in the dataform reading mode, the binarized data corresponding to the dataform are operated on by cell extraction circuitry and dataform decoding circuitry to decode the imaged dataform.

18 Claims, 25 Drawing Sheets

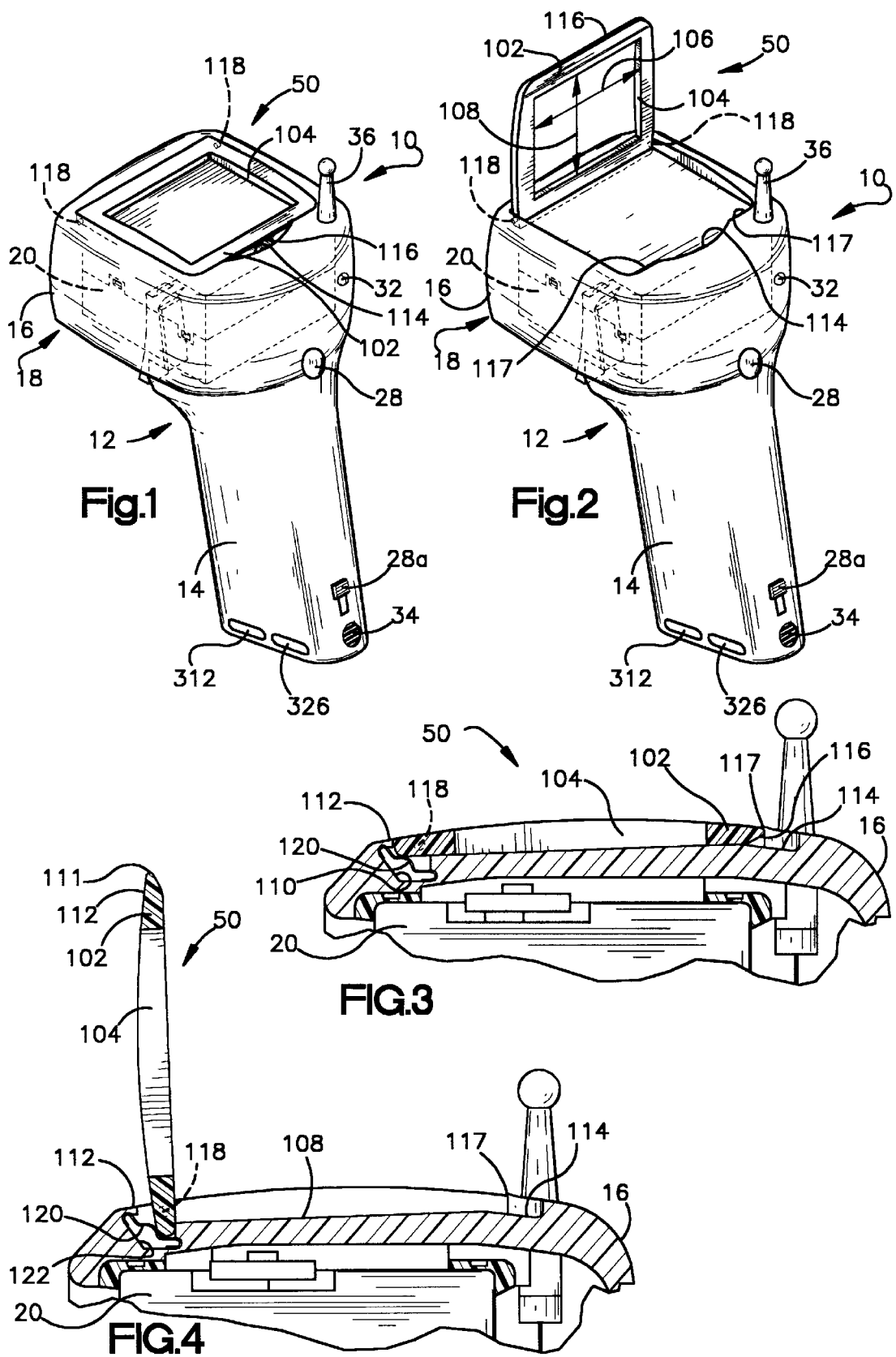

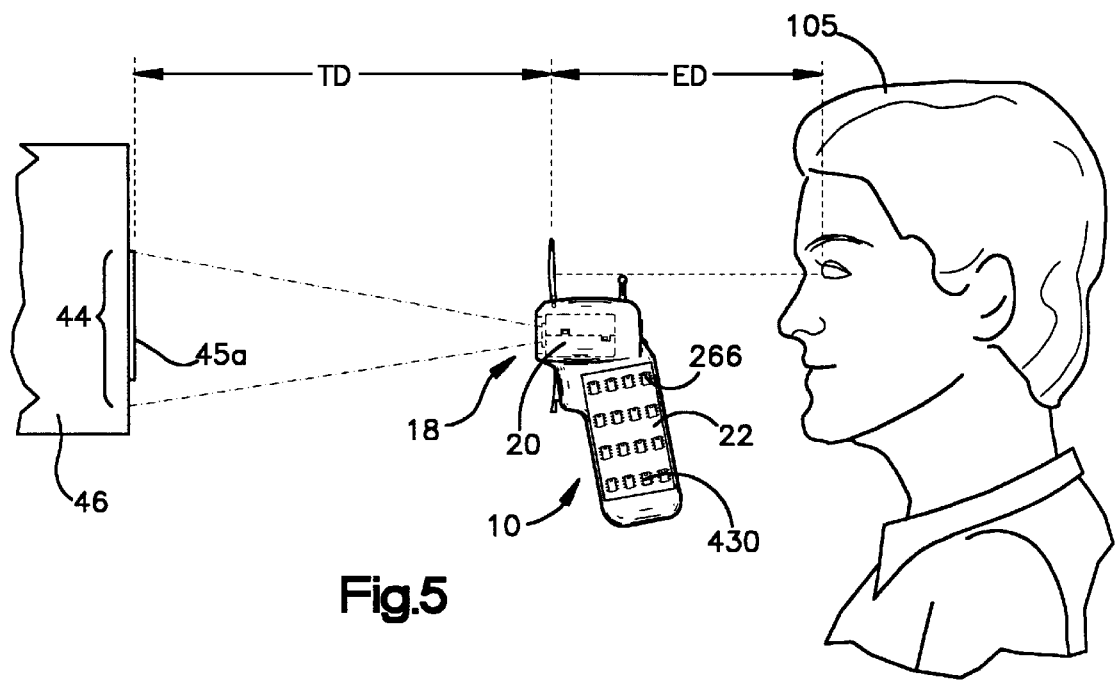
Fig.5
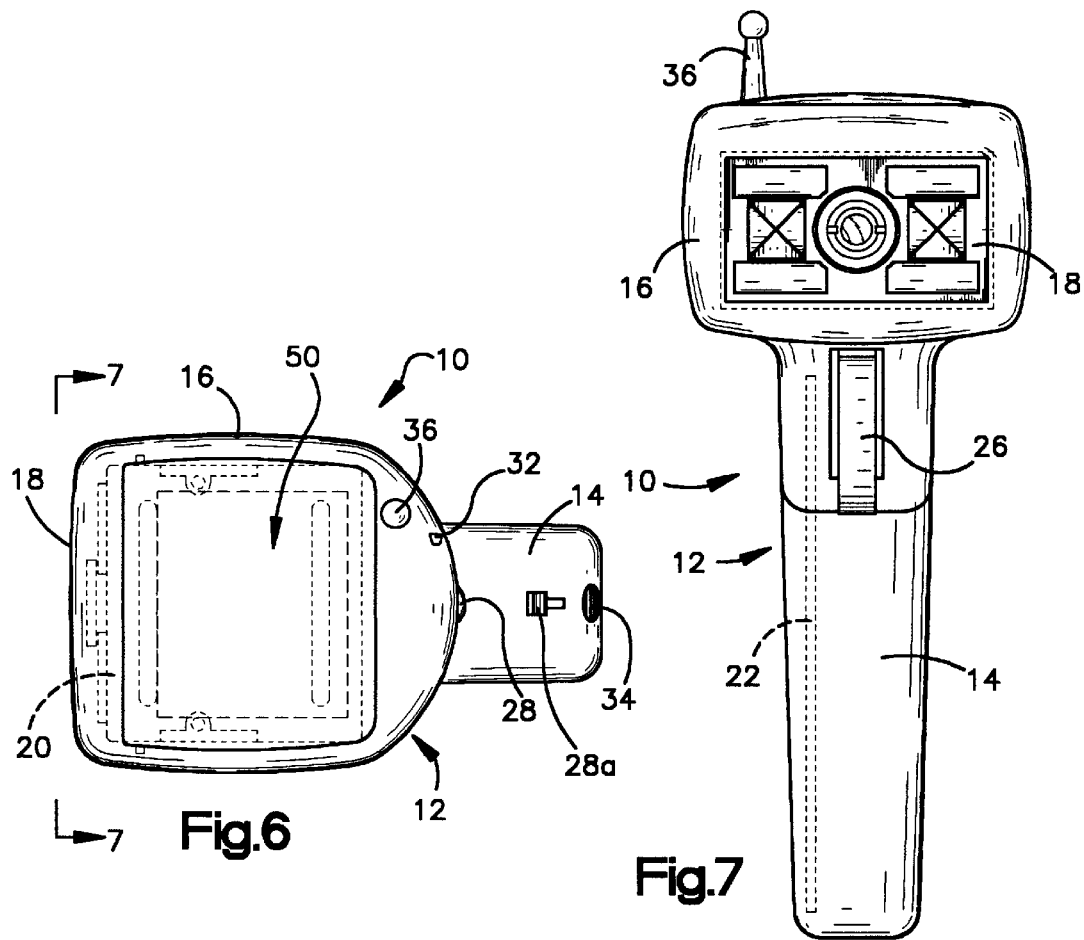
Fig.6
Fig.7

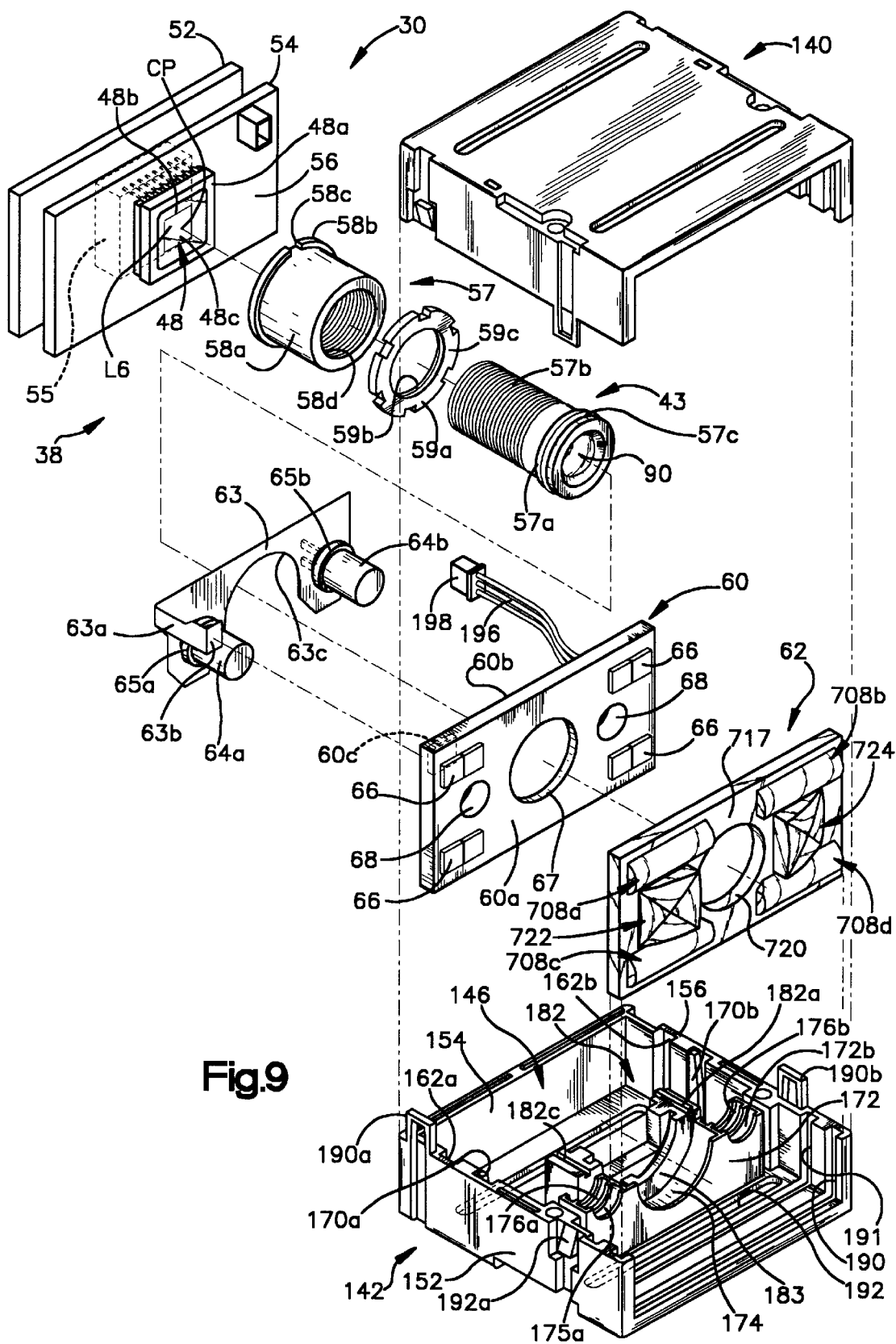

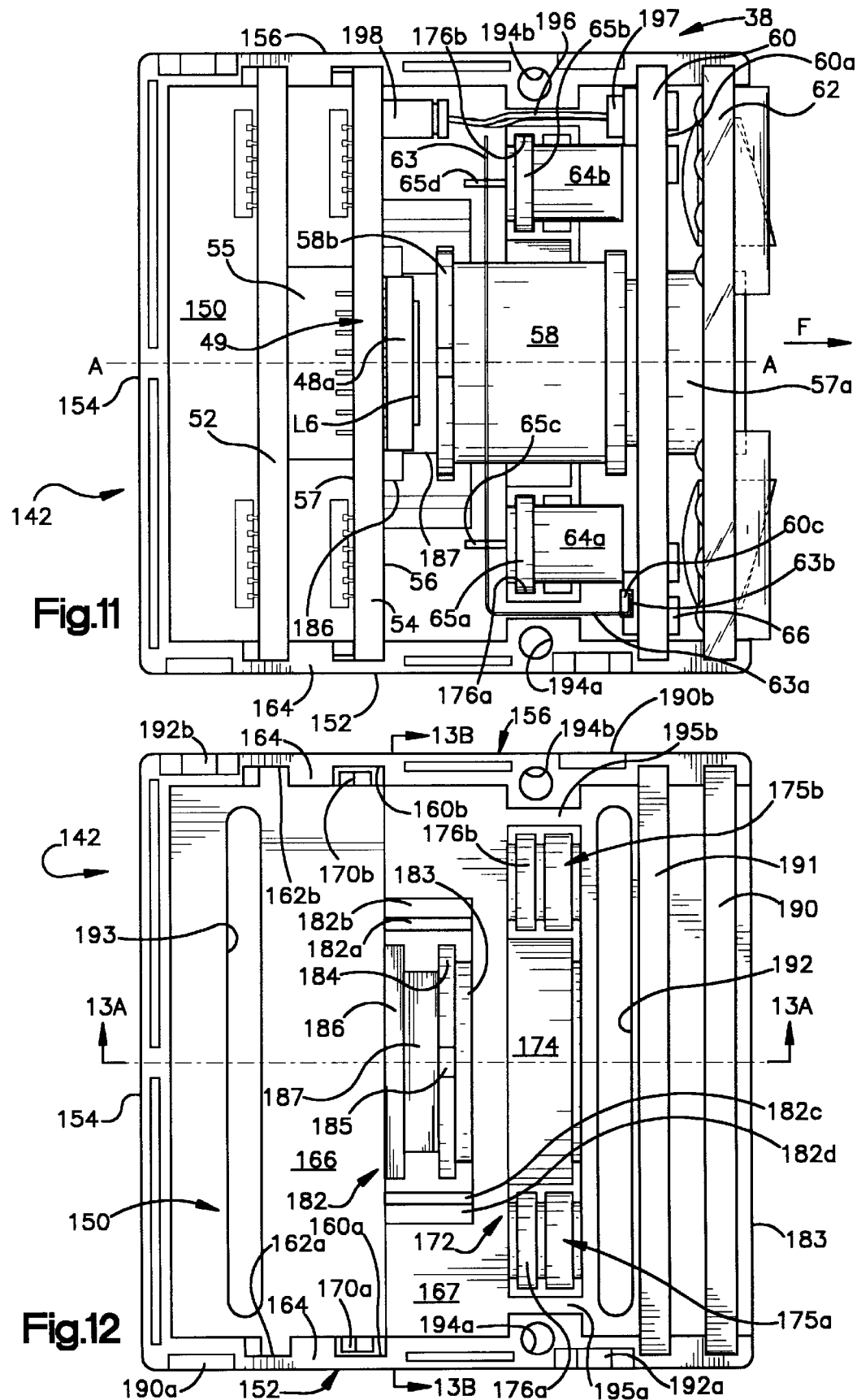

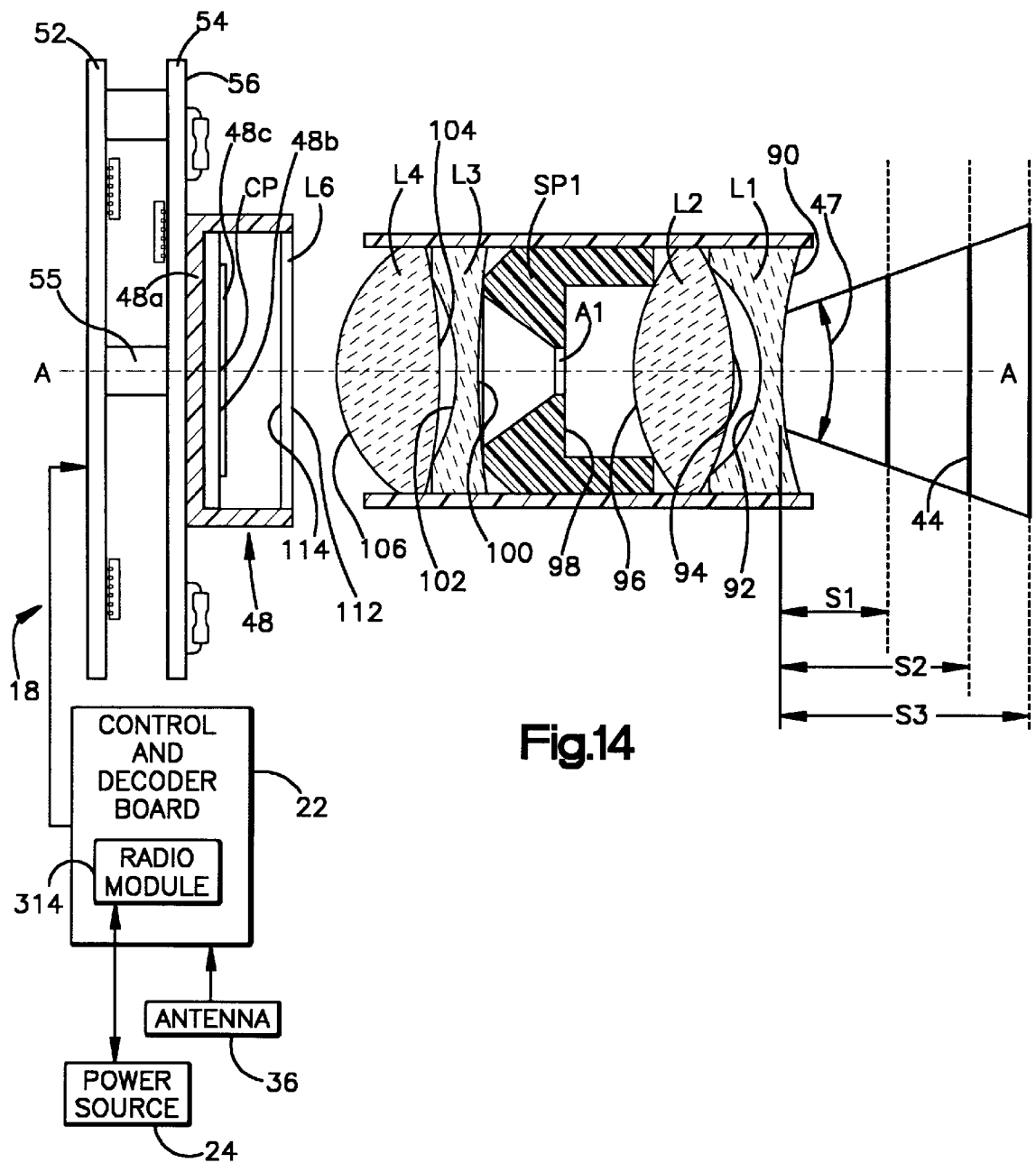

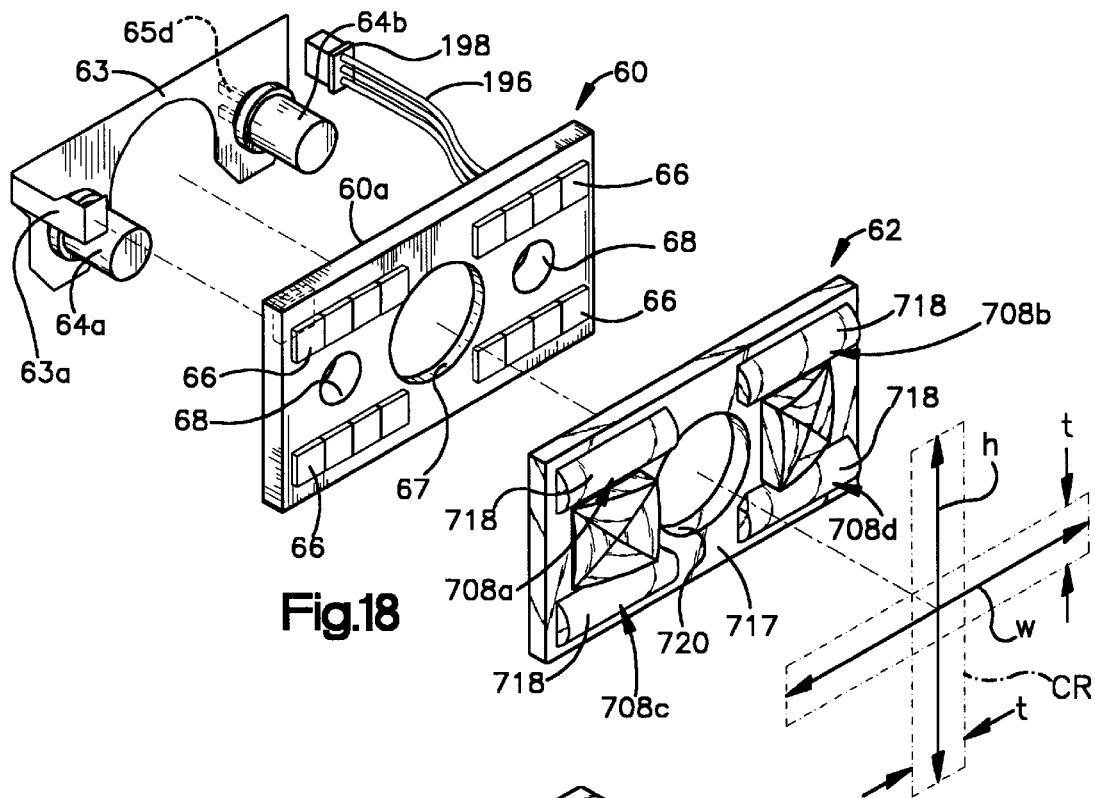
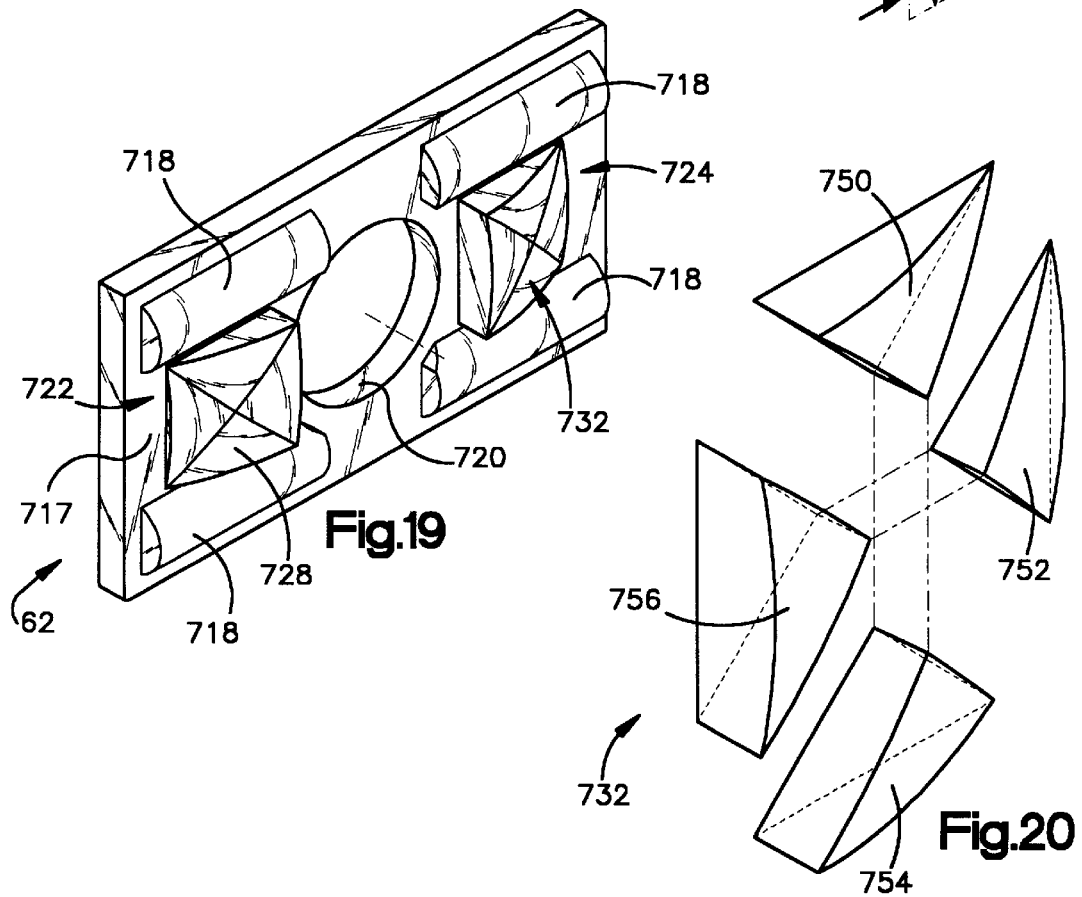

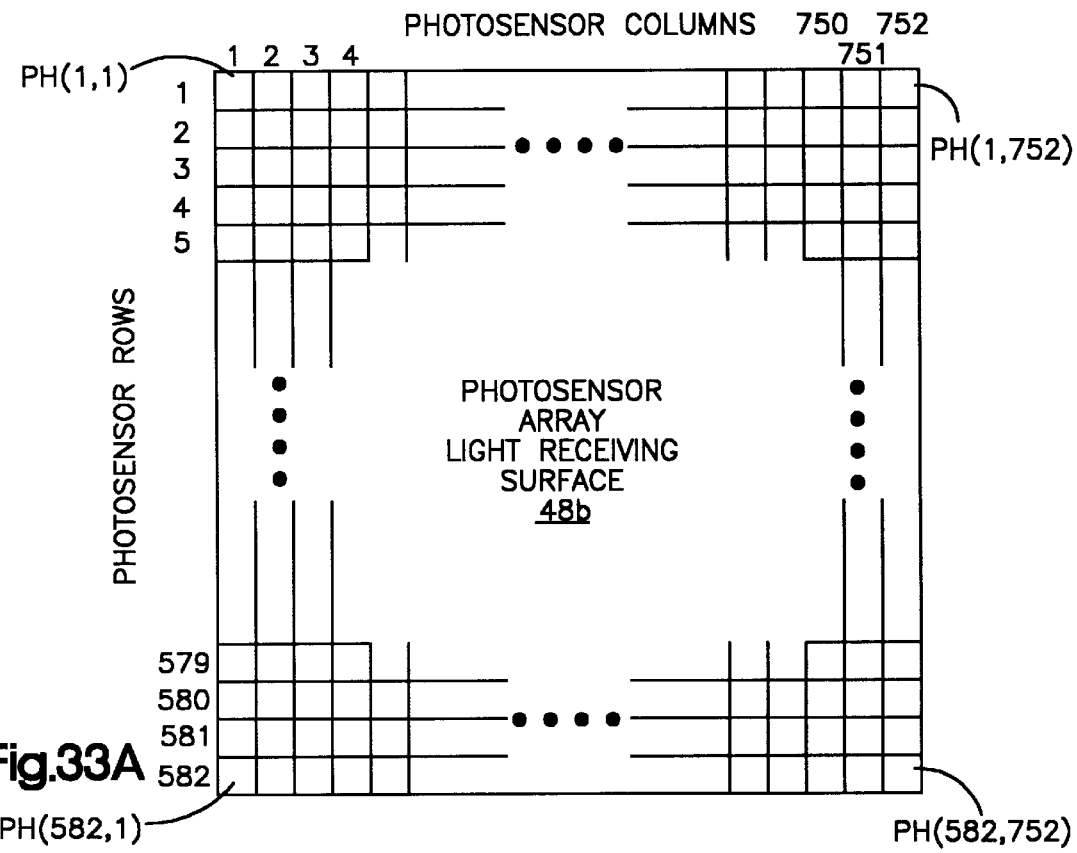
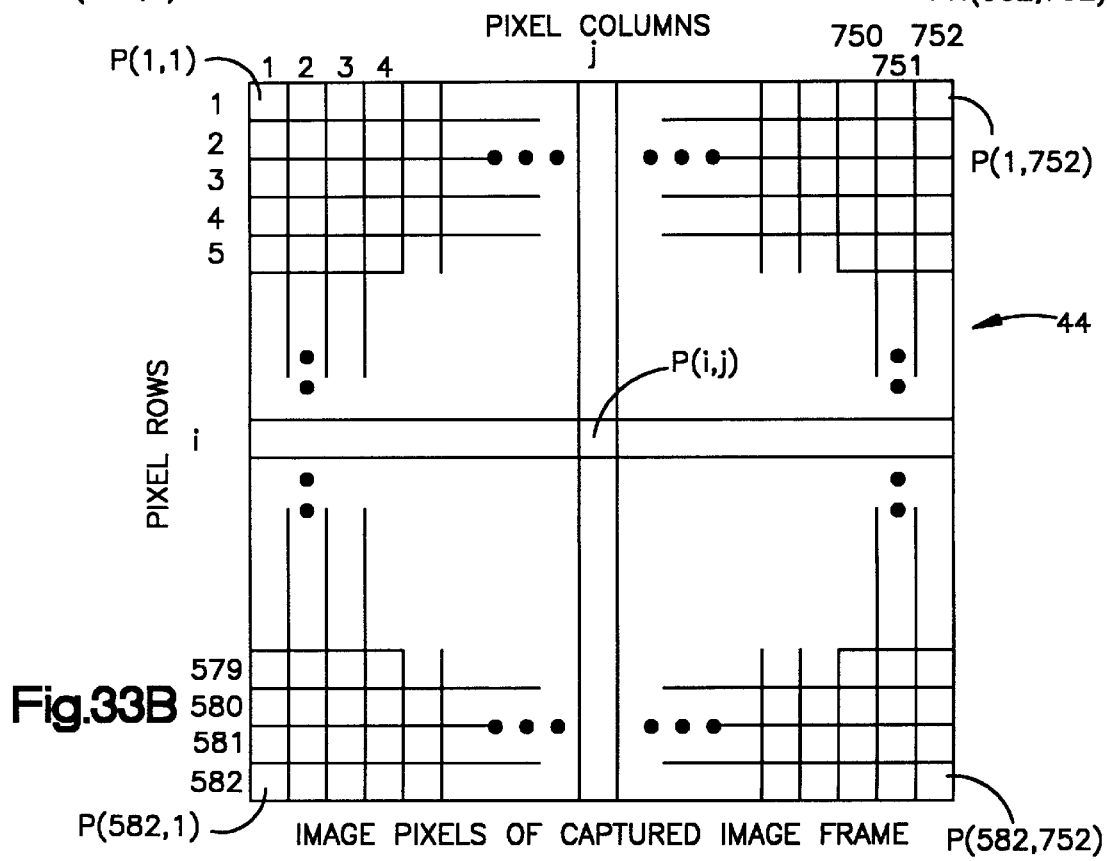

HAND HELD DATAFORM READER UTILIZING BINARIZATION PROCESS FOR DATAFORM AND SIGNATURE AREA CAPTURE

FIELD OF THE INVENTION

The present invention relates to a portable data collection device including an imaging based dataform reader and, more particularly, to a portable data collection device including an imaging based dataform reader utilizing a binarization process to identify and capture an imaged dataform or signature area.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both laser scanners and CCD imaging assemblies are also capable of reading a "stacked" two dimensional (2D) bar code dataforms, such as PDF417, which is comprised of a plurality of adjacent rows of bar code data. The stacked 2D bar code PDF417 includes row indicator patterns utilized by the dataform reader for vertical synchronization to permit reading successive rows of bar code data.

A two dimensional (2D) imaging based dataform reader has been proposed in U.S. application Ser. No. 08/544,618, filed Oct. 18, 1995, now issued as U.S. Pat. No. 5,702,059 on Dec. 30, 1997, and entitled "Extended Working Range Dataform Reader Including Fuzzy Logic Image Control Circuitry". The 2D dataform reader disclosed in application Ser. No. 08/544,618, which is assigned to the assignee of the present application, includes an imaging assembly having a two dimensional array of photosensors adapted to read 2D bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting image generated with the photosensors are read out after an exposure period or periods. The 2D dataform reader disclosed in application Ser. No. 08/544,618 utilizes an open loop feedback control system including fuzzy logic circuitry to determine proper exposure time and gain parameters for a camera assembly. Application Ser. No. 08/544,618 is incorporated in its entirety herein by reference.

In addition to reading a dataform, it may also be desirable for a portable data collection device to be able to capture a signature. For example, in the package delivery industry, a dataform is attached to each package to be delivered. When the package is delivered to its intended addressee, the package's dataform is read to indicate that the package has been delivered. In addition, the person taking custody of the package confirms delivery by signing a log sheet or a shipping document. Typically, the signature of the person receiving the package is filed with the package delivery records.

In U.S. application Ser. No. 08/623,963, filed Mar. 29, 1996 now issued as U.S. Pat. No. 5,793,033 on Aug. 11, 1998, a portable data collection device is disclosed that includes an imaging based dataform reader with signature capture capability. A signature block was provided in which a recipient would sign his or her name. The signature block was at a predetermined location with respect to a dataform to be read. In one embodiment, the dataform included encoded information regarding the coordinates of the signature block with respect to the dataform. Upon reading the dataform and determining the coordinates of the signature block, data representative of the image of the signature block would be saved. The signature block data would be compressed prior to being transmitted or downloaded to a host computer. Application Ser. No. 08/623,963 is incorporated herein in its entirety by reference.

While the dataform reader disclosed in Ser. No. 08/623,963 is useful, it requires the signature block to be at a predetermined position with respect to a dataform to be read. Additionally, in the embodiment described above, data relating to the position of the signature block with respect to the dataform needs to be encoded in the dataform. This encoding of position data within the dataform necessarily reduces the coding area available for other desired information and represents an additional cost in the dataform creation process.

As such, what is needed is a portable data collection device including a dataform reader having the capability to identify and decode an imaged dataform and, additionally, identify and store an imaged signature area without the necessity of having the signature area being at a predetermined position with respect to a dataform or having signature area coordinate information encoded in the dataform.

Specifically, with regard to the package delivery industry, what is needed is a portable data collection device that has the capability of reading various bar code and matrix dataforms as well as recognizing and capturing an image area corresponding to a recipient's signature. The decoded dataform data and digital data representative of the captured signature may be stored in memory in the device and subsequently downloaded at the end of, for example, the delivery person's work shift. Alternately, the portable data collection device may advantageously be equipped with a radio transceiver and the decoded dataform data and the signature data may be transmitted via radio frequency (rf) signals to a host computer to permit real time updating of the status of a package to be delivered.

SUMMARY OF THE INVENTION

In accordance with this invention, a portable data collection device is provided with an imaging assembly that includes dataform reading capture and imaging capability. The dataform reader imaging assembly is selectively actuatable for reading bar code and matrix dataforms (dataform reading mode) and providing an image of an object or portion of an object in the imaging assembly's target area (imaging mode). The imaging assembly of the present invention includes a modular board camera assembly having a charge coupled device (CCD) two dimensional (2D) photosensor array, an optic assembly for focusing an image of the target area onto the photosensor array and an illumination assembly providing targeting illumination to aid a user in aiming the device at a target object area and target area illumination providing light, in addition to ambient illumination, that reflects off the target object and is focused onto the photosensor array.

The modular board camera assembly includes circuitry generating an analog composite video signal. The 2D photosensor array is comprised of a two dimensional matrix of photosensors. The composite analog video signal generated by the modular board camera assembly represents successive image frames of the imaging assembly target area. The composite video signal is converted by signal processing circuitry to a stream of eight bit digital gray scale values.

There are three modes of operation of the portable data collection device—dataform reading, signature capture imaging and regular imaging. In the dataform reading and signature capture imaging modes of operation, a portion of the set of gray scale values corresponding to a captured image frame is converted by binarization and zoning circuitry into a set of binary (0,1) values in accord with a binarization algorithm. Working from a center of the image area outwardly, the circuitry identifies the binary values corresponding to the imaged target object of interest, a dataform or a signature.

In the dataform reading mode, the binary values corresponding to the target dataform are operated on by cell extraction circuitry. The cell extraction circuitry generates cell extraction values which correspond to an image of the dataform in the target area. Decoding circuitry then operates on the cell extraction values to decode the imaged dataform.

If the portable data collection device imaging assembly is operating in the signature capture imaging mode, the binarized data values corresponding to the target signature area are compressed in accord with a data compression algorithm and stored in memory. The compressed binarized values may be transmitted via a radio module using radio frequency (rf) communication or may be stored in memory for later downloading via a terminal processing board at the end of a work session.

If the portable data collection device imaging assembly is operating in the regular imaging mode, binarization of the gray scale values is not required. Instead, the gray scale values corresponding to one or more captured image frames are compressed using a data compression algorithm and the compressed gray scale values may be transmitted via a radio module using radio frequency (rf) communication or may be stored in memory for later downloading via a terminal processing board at the end of a work session.

As discussed, the portable data collection device of the present invention includes two manually activated trigger switches for controlling the selection circuitry to select between the imaging mode and a the dataform reading mode. A first trigger switch, the dataform decoding trigger, institutes the dataform mode and signals the selection circuitry to output a decoded data corresponding to a representation of a target dataform in a captured image frame. The second trigger switch, the imaging trigger, institutes the imaging mode. The specific imaging mode that the imaging assembly operates in—the signature area capture imaging mode or the normal imaging mode—depends on the position of an operator accessible set switch which extends through the housing.

In the signature capture imaging mode of the imaging mode, depressing the imaging trigger results in one image frame being captured. The gray scale values corresponding to the captured image frame are converted to binary values, compressed and stored in memory.

In the normal imaging operating embodiment, depressing the imaging trigger results in one image frame being captured. The gray scale values corresponding to the captured image frame are compressed and stored in memory. In an alternate operating embodiment of the normal imaging mode, depressing the imaging trigger results in the imaging assembly continuously capturing successive frames as long as the trigger is depressed. Once again gray scale values corresponding to the frames are compressed and stored in memory.

Advantageously, in the signature capture imaging embodiment, the binarization and zoning circuitry of the present invention utilizes a "courser" or larger processing window size (the imaging area is divided up into relatively fewer processing windows, say, for example, 100 processing windows each including 4,350 image pixels) is used in the binarization process. The less processing windows, the smaller the binarization processing time. In the dataform reading mode, the binarization circuitry utilizes a "finer" or smaller processing window size (the imaging area is divided up into more processing windows, say, for example 4,350 processing windows each including 100 image pixels). Moreover, the portable data collection device includes a microprocessor and control and selection circuitry that may be programmed to switch between operating modes in successive activations. For example, if the device is to be used in a task where a dataforn read is always followed by a signature area capture, the binarization circuitry may be programmed to change window processing size appropriately between successive activations.

These and other objects, features and advantages of the invention will become better understood from the detailed description of the preferred embodiments of the invention which are described in conjunction with the accompanying drawings.

BRIEF DESCRIPTION OF THE DRAWINGS

FIG. 1 is a perspective view of a portable data collection device of the present invention with a pivoting member of a viewing assembly in a folded down position;

FIG. 2 is a perspective view of the portable data collection device of FIG. 1 with the viewing assembly pivoting member in an upright position.

FIG. 3 is a sectional view of a portion of a housing of the portable data collection device of FIG. 1 and the viewing assembly pivoting member in the upright position;

FIG. 4 is a sectional view of a portion of a housing of the portable data collection device of FIG. 1 and the viewing assembly pivoting member in the folded down position;

FIG. 5 is a view partly in side elevation and partly in section showing use of the viewing assembly to aid in aiming the device;

FIG. 6 is a top of the portable data collection device of FIG. 1;

FIG. 7 is a front elevation view of the portable data collection device of FIG. 1 as seen from a plane indicated by the line 7—7 in FIG. 6;

FIG. 9 is an perspective view of the modular camera assembly of FIG. 8;

FIG. 11 is a top plan view of a the modular camera assembly of FIG. 8 with an upper half of the housing removed as seen from a plane indicated by the line 11—11 in FIG. 10;

FIG. 12 is a top plan view of a lower half of the modular camera assembly housing as seen in FIG. 11 with the modular camera assembly components removed;

FIG. 14 is a schematic representation of a plurality of lens of an optic assembly of the modular camera assembly;

FIG. 18 is an exploded perspective view of an illumination assembly of the modular camera assembly of the imaging assembly of the present invention;

FIG. 19 is a perspective view of a lens array or front panel of the illumination assembly of FIG. 18;

FIG. 20 is an exploded perspective view of a targeting optics of the front panel of FIG. 19;

FIG. 33A is a representation of photosensors of the imaging assembly two dimensional photosensor array;

FIG. 33B is a representation of image pixels corresponding to photosensors of the imaging assembly photosensor array;

DETAILED DESCRIPTION

Figure 8:
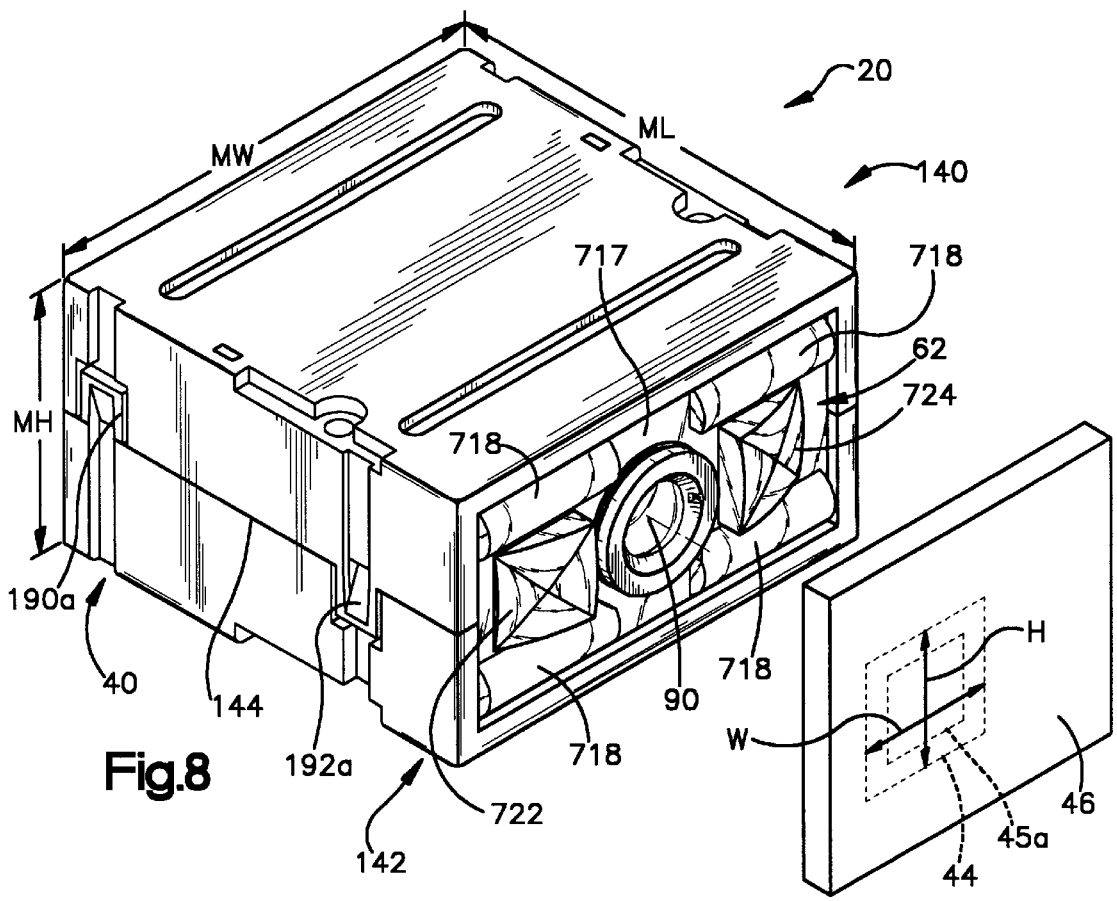
FIG. 8 is a perspective view of a modular camera assembly of an imaging assembly of the portable data collection device of the present invention, the modular portion shown imaging a target dataform affixed to a target item.
Figures 26, 27, 28:
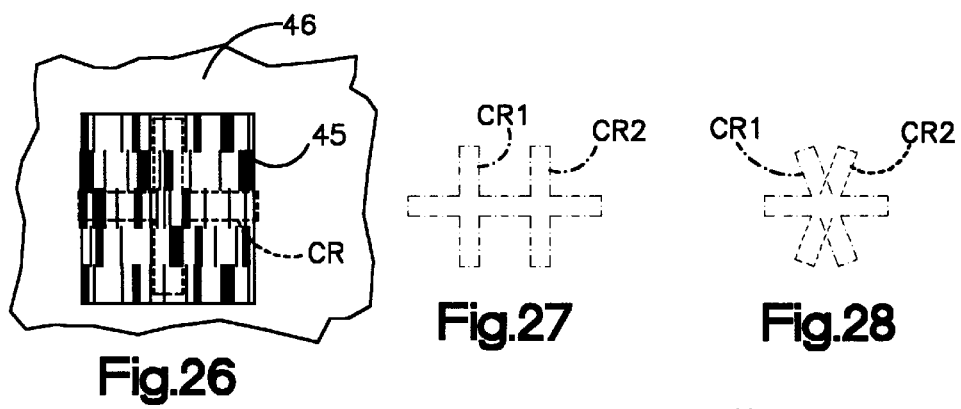
FIG. 26 is a representation of a crosshair illumination pattern generated by the illumination assembly of FIG. 18 superimposed on a target two dimensional bar code dataform.
FIG. 27 is a representation of a separation of crosshair illumination patterns of two targeting optics of the illumination assembly of FIG. 18 caused by imaging with the portable data collection device at a distance from a target object significantly different than a best focus position of the optic assembly of the device.
FIG. 28 is a representation of an angular shift of crosshair illumination patterns of two targeting optics of the illumination assembly of FIG. 18 caused by imaging with the portable data collection device tilted such that the front panel is not substantially parallel to a surface of a target object.
Figure 34:
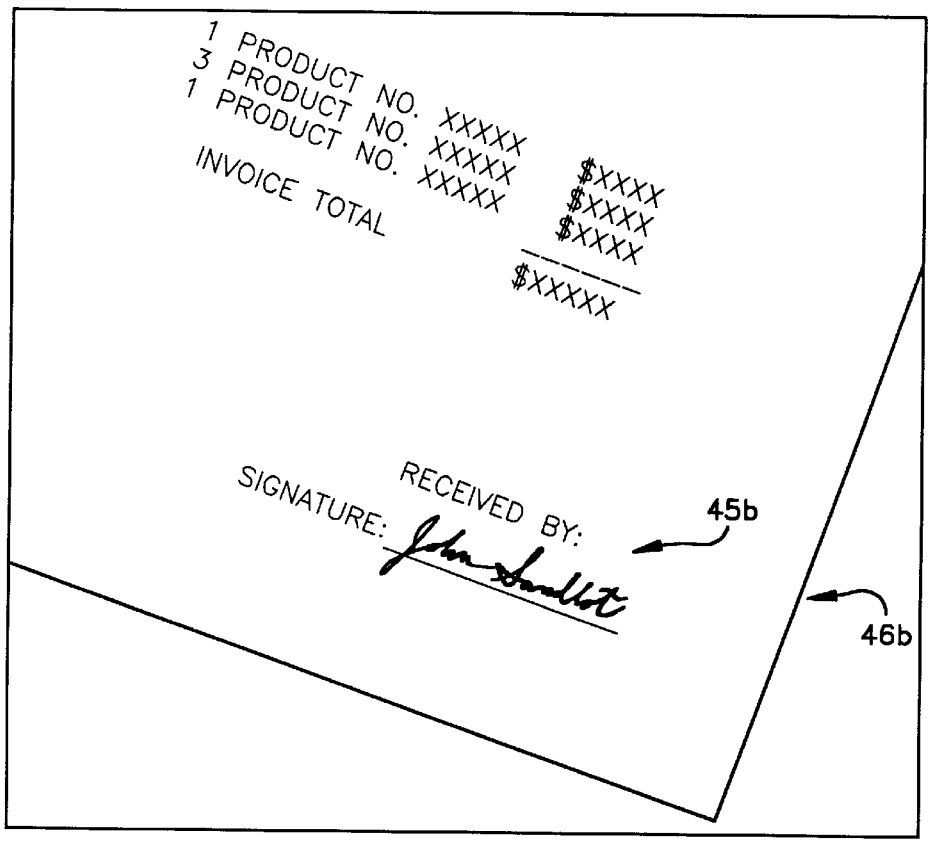
FIG. 34 is a portion of a document including a signature area.
Figure 35:
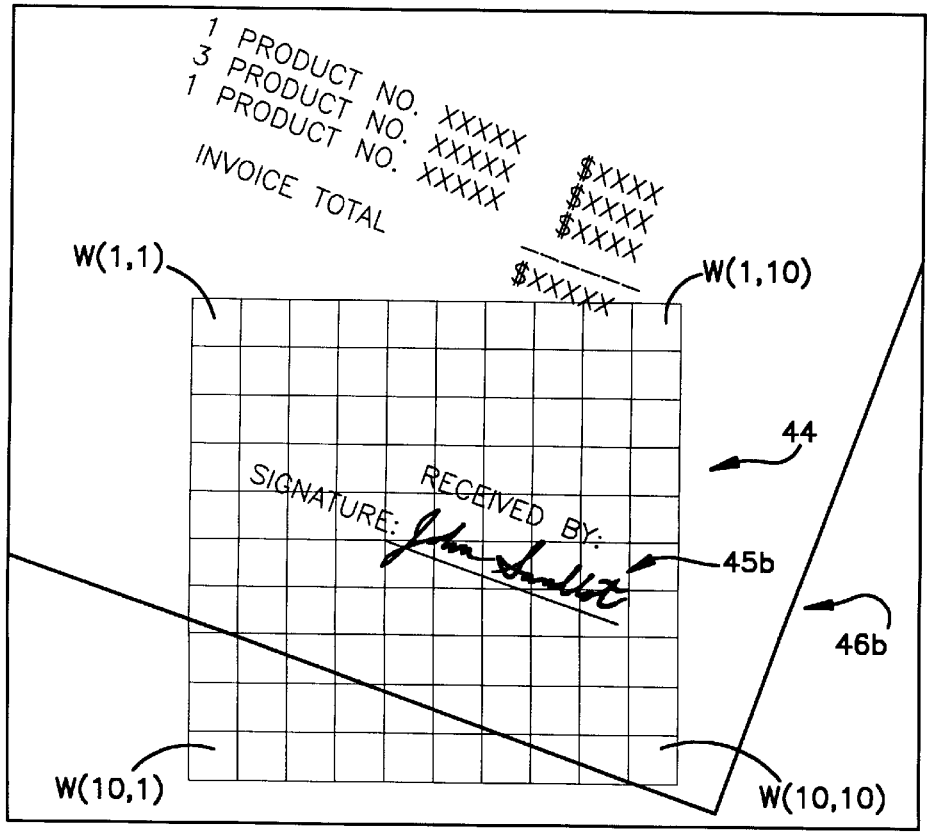
FIG. 35 is a representation of image windows overlying the signature area of the document of FIG. 34.
Figure 36:
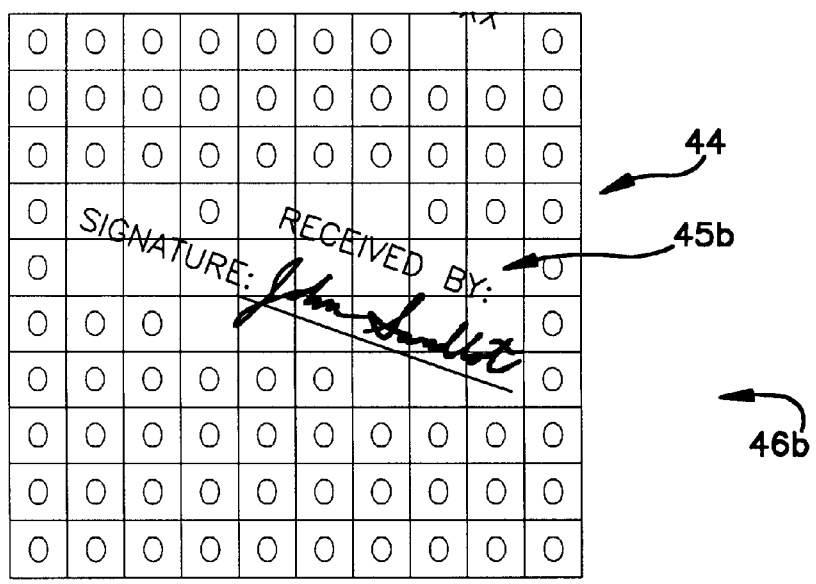
FIG. 36 is a representation of zoning or bounding of the signature area of the document of FIG. 34.

Turning to the drawings, a portable, hand held data collection device in accordance with the present invention is shown generally at 10 in FIGS. 1–8. The portable data collection device includes a two dimensional (2D) charge coupled device (CCD) photosensor array imaging assembly 18 which is capable of imaging a target object located within an imaging target area 44 of the imaging assembly. A target object may be:

a) a dataform to be read as shown at 45a in FIGS. 5, 8 and 26;

b) a signature area to be imaged as shown at 45b in FIGS. 34, 35, 36, 37A and 38;

c) a specific item or document to be imaged, a representative product to be imaged is shown at 46a in FIGS. 5 and 8 and a representative document to be imaged is shown at 46b in FIGS. 34–36.

The imaging assembly 18 operates in a selected one of three modes—a dataform reading mode (corresponding to (a) above), a signature area capture mode (corresponding to (b) above), and a normal imaging mode (corresponding to (c) above). The modes are shown schematically in FIGS. 31A & 31B and 32A & 32B). The imaging assembly 18 employs a novel binarization and zoning process when operated in the dataform reading mode or the signature area capture mode that results in a more efficient and effective reading of a target dataform 45*a* or capturing the image of a target signature area 45*b*.

Configuration of the Portable Data Collection Device 10

The data collection device 10 includes a housing 12 defining an interior region. The housing 12 includes a gripping portion 14 sized to be grasped in the hand of an operator and an angled snout 16 extending from the gripping portion 14. With specific reference to FIG. 8, the snout 16 includes an opening through which a portion of the imaging assembly 18 extends. The imaging assembly 18 includes a modular camera assembly 20 and a control and decoder board 22 electrically coupled to electronic circuitry of the modular camera assembly. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through an opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand.

The gripping portion 14 also includes a small opening through which a distal portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform or imaging a target area. The color red is displayed when the device 10 is not ready to perform an operation. Finally, the housing 12 includes an opening exposing a portion of a microphone 34 mounted in the housing interior region and another opening through which a radio antenna 36 extends.

A two position set switch 28*a* extends through an opening in the gripping portion 14. Depending on the position of the switch 28*a*, when the imaging trigger 28 is actuated, the imaging assembly 18 will operate in either the normal imaging mode or the signature area capture imaging mode as will be explained below. A serial data output port 312 also extends through an opening in the gripping portion 14. The port 312 permits downloading of data stored in a memory 311 (shown schematically in FIG. 29A). The interior region of the housing 12 supports the imaging assembly 18 and other electronic circuitry to be described below.

Configuration and Operation of the Modular Camera Assembly 20

Referring to FIGS. 8 and 9, which show perspective and exploded perspective views of the modular camera assembly 20 of the imaging assembly 18. It can be seen that the modular camera assembly 20 includes a housing 40 which supports an illumination assembly 42 and a board camera assembly 38. The board camera assembly 38 includes a two dimensional photosensor array 48 mounted on a surface 56 of a printed circuit board 54. The printed circuit board 54 and another printed circuit board 52 support board camera circuitry that, when actuated, generates a composite video signal 262 (shown schematically in FIGS. 29A and 29B). The modular camera assembly 20 includes an optic assembly 43 which focuses an image of the imaging target area 44 onto a 2D photosensor array 48 (shown schematically in FIG. 14). Specifically, reflected light from the imaging target area 44 is focused by the optic assembly 43 onto an outwardly facing, light receiving surface 48*b* of the photosensor array 48. The photosensor array 48 is part of a surface mounted integrated circuit (IC) chip 48*a*.

Structure of Photosensor Array 48

The photosensor array light receiving surface 48*b* includes an array of 584 rows by 752 columns of light sensitive photosensors for a total of 439,168 photosensors in the photosensor array. An image of the imaging target area 44 is focused on the light receiving surface 48*b*. Light incident on a photosensor during an exposure period charges the photosensor. Subsequent to the exposure period, the photosensor charge is read out or discharged. The charge magnitude or voltage read out from a photosensor represents an integration of the intensity of the reflected light focused on the photosensor over the exposure period.

Each photosensor of the photosensor array 48 corresponds to a picture element or pixel of a captured image field or frame. For example, a representation of the light receiving surface 48*a* of the photosensor array is shown in FIG. 33A. A photosensor labeled PH(1,1) is located at the intersection of photosensor row 1 and photosensor column 1 of the photosensor array 48. The range of photosensor rows ranges from 1 to 582 and the range of photosensor columns ranges from 1 to 752 for a total of 439,168 photosensors. The corresponding set of image pixels for a captured image frame is represented in FIG. 33B. As can be seen from comparing FIGS. 33A and 33B, the image pixel labeled P(1,1) in FIG. 33B corresponds to the photosensor labeled PH(1,1) in FIG. 33A. The image pixel labeled P(582, 752) in FIG. 33B corresponds to the photosensor labeled PH(582, 752) in FIG. 33A. The photosensors of the photosensor array 48 are read out in a frame mode interlaced format which means at a time t1, photosensors in every other row of the photosensor array are read out (e.g., rows 1, 3, 5, . . . 581) to generate a first captured image field comprising 219,584 image pixels. At a later time t2, photosensors in the other rows are read out (e.g., rows 2, 4, 6, . . . 582) to generate a second captured image field comprising 219,584 image pixels. The images represented in the first and second captured image fields, when appropriately interlaced in a row by row fashion comprise a full captured image frame comprising 439,168 image pixels.

Imaging Target Area 44 of Board Camera Assembly 38

The imaging target area 44 is defined by a field of view of the board camera assembly 38 and is represented in FIG. 8 by the dimensions labeled "H" (for height of imaging target area 44) and "W" (for width of the imaging target area 44). The illumination assembly 42 includes four illumination optic portions 88*a*, 88*b*, 88*c*, 88*d* which project a uniform intensity distribution of illumination across the imaging target area 44. The illumination assembly 42 also includes a targeting arrangement including targeting LEDs 64*a*, 64*b*, which, when energized, project illumination through first and second targeting optics 72*a*, 74*a* thereby generating a crosshair targeting illumination pattern CR (FIG. 18) to aid in aiming the device 10. To avoid image distortion, the targeting pattern CR is turned off by the imaging assembly 18 when the image frames of the imaging target area 44 are being captured.

The imaging assembly 18 is capable of decoding a target dataform 45a affixed to the item 46a. (Note that the item 46a may also be imaged if desired if the portable data collection device 10 is used in the normal imaging mode. This would occur, for example, if the item 46a were damaged and an operator 105 of the device 10 was instructed to image all damaged items whose dataforms were being read as will be discussed below.) The target dataform 45a may be a one dimensional bar code dataform such as Codabar, Code 39, Code 93, Code 128, Interleaved 2 of 5, and UPC/EAN; a two dimensional bar code dataform such as PDF417 and Super-Code; or a matrix dataform such as MaxiCode and Data-Matrix. The optic assembly 43 of the present invention is specifically configured to permit reading by the imaging assembly of standard density dataforms having a minimum cell size of 6.6 mils (0.0066 in. or 0.167 mm.). The minimum cell size of a dataform is defined as the smallest dimension of a separately readable information conveying portion of the dataform.

Figure 30:
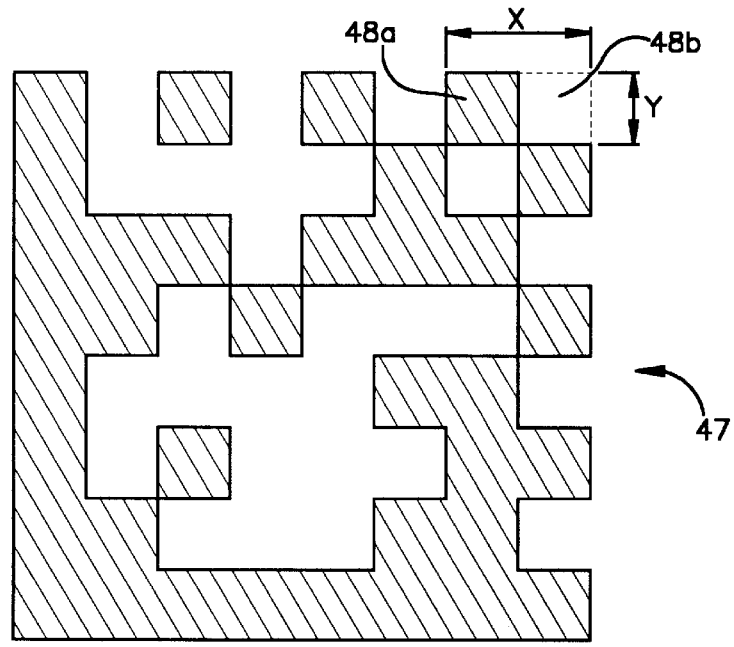
FIG. 30 is a representation of a matrix dataform showing cell size.

As an example, FIG. 30 shows a DataMatix dataform at 47. (DataMatrix is a binary symbology of International Data Matrix, Inc. of Clearwater, Fla. and is described in U.S. Pat. No. 5,473,151 to Priddy et al.) The two visual squares labeled 48a, 48b, with 48a being a dark block and 48b being a light block labeled may constitute a separately readable information conveying portion of the dataform 47, namely, the letter "B". The cell size of the letter "B" would be the horizontal and vertical dimensions labeled "x" and "y" in FIG. 30. As can be seen, the vertical dimension "y" is one half the size of the horizontal dimension "x". Thus, the minimum cell size for the letter "B" would be the vertical dimension "y". Additionally, the imaging assembly 18 is capable of capturing an image of the two dimensional imaging target area 44.

Viewing Assembly 50

Referring again to FIGS. 1–7, a top portion of the housing upper snout 16 supports a viewing assembly 50 which may optionally be used to aid in aiming the device 10 such as at the target dataform 45a, the target signature area 45b or the target object 46a. The viewing assembly 50 includes a pivoting member 102 which pivots between a folded down position (FIGS. 1 and 3) and an upright position (FIGS. 2 and 4). The pivoting member 102 includes a rectangular opening 104. The opening 104 is approximately 32 mm. in the horizontal direction, labeled 106 in FIG. 2, and is approximately 24 mm. in the vertical direction, labeled 108 in FIG. 2. The ratio of the horizontal dimension 106 to the vertical dimension 109 is chosen to correspond to the ratio of the horizontal dimension to the vertical dimension of the matrix of photosensors comprising the 2D photosensor array 48. As can be seen in FIG. 5, when in an upright position, the pivoting member 102 aids an operator 105 is aiming the device 10 such that the field of view or imaging target area 44 of the imaging assembly 18 overlies the target dataform 45a affixed to the item or object 46a. The vertical and horizontal dimensions 106, 109 are chosen such that if a distance ED (FIG. 5) between the pivoting member 102 and the eye of the operator 105 is 90 mm. (3.5 in.) and a distance TD between the pivoting member and the target dataform 45a is 140 mm. (5.5 in.), the target area seen through the rectangular opening 104 is substantially equal to the imaging target area 44 of the imaging assembly 18.

The pivoting member 102, when in the folded down position, is received in a well or recessed area 108 defined by an upper surface 113 of the housing snout 16. In the folded down position, an upper surface 112 (FIG. 4) of the pivoting member 102 is substantially flush with the snout upper surface 113. The snout upper surface 113 includes a recessed portion 114 (FIGS. 3 and 4) sized to permit an operator's finger tip to slip under a front lip 116 of the pivoting member 102 to permit the member to be popped up to the upright position from the folded down position. As can best be seen in FIGS. 3 and 4, the pivoting member front lip 116 fits under a slightly extending upper edge 117 of the snout upper surface 113 to hold the pivoting member 102 with a slight interference fit in the folded down position.

The pivoting member 102 pivots on a pair of cylindrical portions 118 which extend from sides of the pivoting member near its bottom edge. The cylindrical portions 118 rotatably fit within corresponding cylindrical recesses in the snout 16". Turning to FIGS. 3 and 4, an arcuate biasing spring 120 positioned in a recessed portion 122 of the snout 16. The recessed portion 122 is shaped to confine the spring 120 with edge portions of the snout defining the recessed portion. The spring 120 has a humped middle portion which biases the pivoting member 102 to either the upright position or the folded down position.

Modular Camera Assembly Housing 40

The modular camera assembly 20 is shown in FIGS. 8–13B. Suitable exterior dimensions for the housing 40 are as follows:

| Housing | Label | Dimension |
| --- | --- | --- |
| Height | MH (FIG. 8) | 1.02 in. (26 mm.) |
| Width | MW (FIG. 8) | 1.65 in. (42 mm.) |
| Length | ML (FIG. 8) | 1.57 in. (40 mm.) |

The housing 40 includes an upper portion 140 and a symmetrical lower portion 142. The upper and lower portions 140, 142 are advantageously identically shaped and positioned symmetrically about a part line 144 and define an interior region 146 (FIG. 9) in which components of the modular camera assembly 20 are supported. Since the upper and lower portions 140, 142 are symmetrical, only the construction of the lower portion 142 will be discussed with the understanding that the same construction and features are present in the mating upper portion 140. In this way, fabrication and assembly of the modular camera assembly 20 is simplified because the housing portions 140, 142 are interchangeable and, therefore, only one configuration needs to be fabricated.

As can best be seen in FIGS. 9, 12, 13a and 13b, the housing lower portion 142 includes a substantially flat base 150 and three side walls 152, 154, 156 extending perpendicularly from the base 150. An inner surface of the side wall 152 includes two spaced apart slots 160a, 162a extending from an upper edge 164 of the housing lower portion 142 defined by the side walls 152, 154, 156 to an inner surface 166 of the base 150. Similarly, an inner surface of the side wall 156 includes matching spaced apart slots 160b, 162b extending from the upper edge 164 of the housing lower portion 142 to the inner surface 166 of the base 150.

Figure 13A:
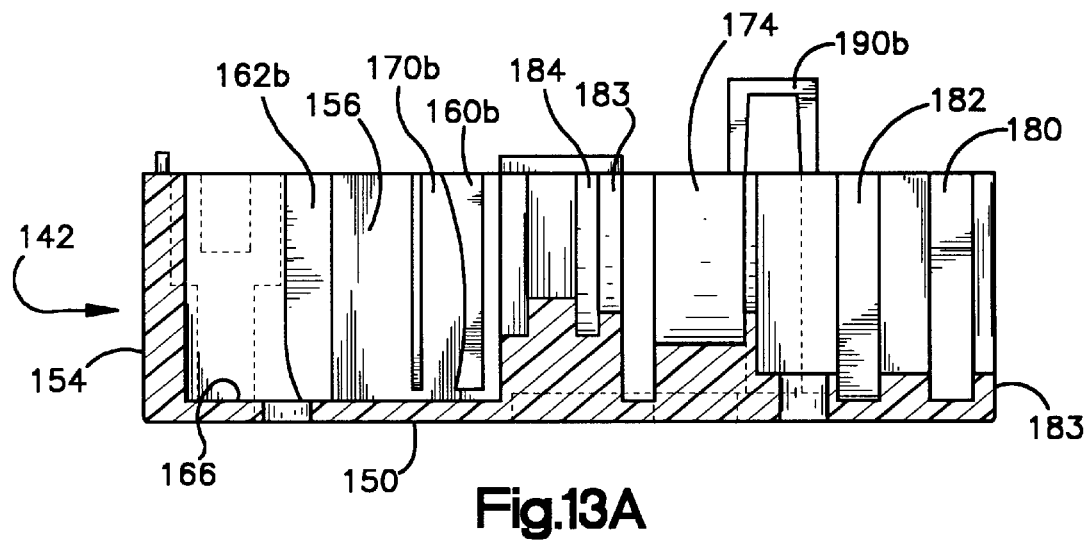
FIG. 13A is a sectional view of the lower half of the modular camera assembly housing as seen from a plane indicated by the line 13A—13A in FIG. 12.

The modular camera assembly 20 includes circuitry mounted on a set of two parallel, spaced apart rear and front printed circuit boards 52, 54 affixed to a spacer element 55 (FIGS. 11 and 14). The slots 162a, 162b receive and securely hold the rear printed circuit board 52 (FIG. 11) while the slots 160a, 160b receive the front printed circuit board 54. Mounted on a front surface 56 of the front printed circuit board 54 is the 2D photosensor array IC chip 48a. The optic assembly 43 must be precisely aligned with the photosensor array 48 to insure proper imaging of the imaging target area 44. Spring-like projections 170a, 170b (FIGS. 9 and 12)

extend upwardly from the base inner surface 166. As can best be seen in FIG. 12, the projections 170a, 170b are spaced from their respective side walls 152, 156 but are still within regions defined by the slots 160a, 160b. When the printed circuit boards 52, 54 are inserted in their respective slots 162a, 162b, 160a, 160b, the projections 170a, 170b flex and push in a horizontal direction against a back side 57 (FIG. 11) of the printed circuit board 54 in a direction labeled F to insure the boards 52, 54 are securely held in place and the photosensor array 48 is precisely located. Additionally, as can be seen in FIGS. 12 and 13A, the slots 162a, 162b are tapered adjacent the base inner surface 166. The slots 162a, 162b become narrower near the base 150 thereby forcing the printed circuit board 52 in the direction F. The taper of the slots 162a, 162b combined with the projections 170a, 170b in the slots 160a, 160b apply sufficient force to the printed circuit boards 52, 54 so as to eliminate any "play" of the rear and front printed circuit boards 52, 54 in their respective slots.

The housing lower portion 142 also includes first and second supports 172, 182 extending upwardly from a slightly raised portion 167 (FIG. 12) of the base inner surface 166. As can. best be seen in FIGS. 9, 11 and 12, the first support 172 includes a central portion 174 with a semicircular recess flanked by two outerlying portions 175a, 175b having smaller semicircular recesses. The central portion 174 supports an outer shroud 58a of the optic assembly 43. The two smaller outerlying portions support respective targeting light emitting diodes 73a, 73b of the illumination assembly 42. The targeting LEDs 64a, 64b are cylindrically shaped and include enlarged diameter base portions 65a, 65b (best seen in FIG. 11) which fit into inwardly stepped semicircular recesses 176a, 176b of the outerlying portions 175a, 175b. A first end portion 183 of the second support 182 includes a semicircular recess which supports the outer shroud 58a. Just inward of the end portion 183 is a portion 184 (FIGS. 12 and 13A) defining another semicircular recess having a slightly larger diameter than the recess of the end portion 183. The portion 184 is sized to receive an outwardly flared end portion 58b of the outer shroud 58a and thereby position it precisely with respect to the photosensor array 48. The outwardly flared end portion 58b of the outer shroud 58a includes two small cut out portions 59c (only one of which can be seen in FIG. 9). One of the cut out portions 59c fits onto a raised 185 nub of the semicircular shaped portion 184 to prevent the outer shroud 59a from rotating within the housing 40. The other cut out portion 59c, of course, fits onto an identical nub (not shown) of the upper housing portion 140 which is identical in shape and configuration to the lower housing portion 142.

Figure 13B:
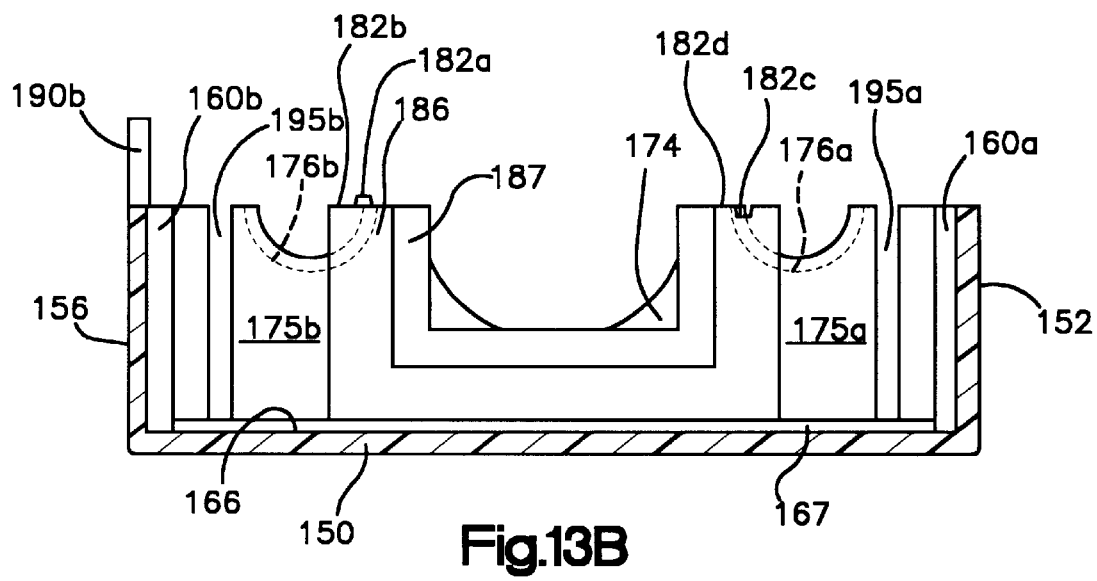
FIG. 13B is another sectional view of the lower half of the modular camera assembly housing as seen from a plane indicated by the line 13B—13B in FIG. 12.

As can best be seen in FIG. 13B, a second end portion 186 of the second support 182 includes a rectangular shaped recess. Disposed between the second end portion 186 and the portion 184 is a portion 187 (FIGS. 12, 13A and 13B) defining a rectangular shaped recess that is slightly smaller size than the recess defined by the end portion 186. As can be seen in FIG. 11, the recess of the portion 184 receives an extending portion of the photosensor array IC chip 48a. The photosensor array chip 48a is mounted to the front surface 56 of the printed circuit board 54. The front surface 56 of the printed circuit board 54 abuts the second support end portion 186 and, thus, the light receiving surface 48b of the photosensor array 48 is precisely positioned with respect to the support and with respect to the optic assembly 43 both in terms of a distance between the lens L5 of the optic assembly and photosensor array 48 and the perpendicularity between a longitudinal axis through the lenses L1, L2, L3, L4 and the light receiving surface 48b of the photosensor array 48. The light receiving surface 48b is coincident with the image plane of the optic assembly 43. As can best be seen schematically in FIG. 14, the light receiving surface 48b is overlaid by the color filter 48c. Spaced from the photosensor array 48 is an overlaying protective lens L5 supported by an upper surface of the IC chip 48a.

The shroud assembly outer shroud 58a and the second support 182 function to prevent ambient light from impinging on the photosensor array 48. When the housing upper and lower portions are 140, 142 are assembled, the second support 182 of the two portions encircle the outer shroud end 58a and the photosensor array 48.

As can be seen in FIGS. 9, 12 and 13B, a raised ledge 182a extends upwardly from an upper surface 182c of one side of the second support 182. A mating recess 182c is formed in an upper surface 182d of the opposite side of the second support 182. When the upper and lower housing portions 140, 142 are assembled, the raised ledge 182a of the lower housing portion 142 is received in a mating recess in an upper surface of a second support of the upper housing portion 140. The mating recess of the upper housing portion 140, of course, is identical to the recess 182c of the lower housing portion 142 as the portions 140, 142 are identical in configuration. Similarly, the mating recess 182c of the lower housing portion 142 receives a raised ledge of an upper surface of the second support of the upper housing portion. The raised ledge of the upper housing portion 140, of course is identical to the raised ledge 182a of the lower housing portion 142. The interlocking of the respective raised ledges 182a and mating recesses 182c of the second supports 182 of the housing upper and lower portions 140, 142, insure the area between an end 58a of the shroud assembly 57 and the photosensor array support 49 is light tight. In addition to preventing ambient light from impinging on the photosensor array 48, the second support 182 of the housing upper and lower portions 140, 142 support the shroud assembly 58 and insure that the optical axis A—A through the centers of the lenses L1, L2, L3, L4 and the pinhole aperture A1 of the spacer member SP1 is perpendicular to the light receiving surface 48b of the photosensor array 48 and is also aligned with the center point CP of the photosensor array 48.

The housing lower portion 142 includes two unshaped latches 190a, 190b extending upwardly from the upper edge 164 of the respective side walls 152, 156 and two tapered detents 192a, 192b in recessed portions of the side walls 152, 156 that engage similar detents and latches of the upper portion 140 to seal the mating upper and lower housing portions 140, 142. As can be seen in FIG. 8, the two latches 190a, 190b engage respective detents in the housing upper portion 140 corresponding to the detents 192a, 192b of the housing lower portion. Similarly, the detents 192a, 192b are engaged by unshaped latches of the upper portion. The latches are flexible enough to deflect as they traverse their respective tapered detents and then snap into engagement position once the central openings of the detents pass the detents. The lower housing includes to apertures 194a, 194b (FIGS. 11 and 12) which align with identical apertures of the upper portion 140 to facilitate affixing the module 20 within the housing extending snout 16. The circuit board 60 supports a plurality of surface mount illumination LEDs affixed to a front surface of the board 60. When the housing upper and lower portions 140, 142 are assembled, ventilation of the electronic components supported therein including the board camera assembly 38 and the illumination assembly 42 is provided by two elongated openings 192, 193 (FIG. 12).

Two slots 195a, 195b (as seen in FIGS. 12 and 13B) are disposed between the two outerlying portions 175a, 175b and portions of the side walls 152, 156 surrounding apertures 194a, 194b. One of the slots 195a, 195b provide a passageway for a plurality of conductive leads 196 extending between a conductor 197 affixed to a back side 60a of the circuit board 60 and a conductor 198 affixed to the front side 56 of the second circuit board 54 of the board camera assembly 38. The other of the slots provides a passage for an angled extending portion 63a (FIG. 18) of a flexible printed circuit board 63. The circuit board 63, typically referred to as "circuit on flex", electrically connects the leads 65c, 65d extending rearwardly from the targeting LEDs 64a, 64b with circuitry on the circuit board 60 to permit selective energization of the LEDs 64a, 64b to aid in aiming the device 10 at a target object or dataform. A front section 63b of the flexible printed circuit board 63 is coupled to the circuitry on the circuit board 60 through a connector 60c disposed on the back of the circuit board 60.

Modular Camera Assembly Components

Disposed in the interior region 146 of the modular housing 40 are the board camera assembly 38, the illumination assembly 42 and the optic assembly 43. The board camera assembly 38 includes the rear printed circuit board 52 and the front printed circuit board 54. The photosensor array IC chip 48a is disposed on the front surface 60a (FIG. 9) of the front printed circuit board 54. The light receiving surface 48b of the photosensor array 48 receives reflected illumination from the imaging target area 44 focused through the optic assembly 43. The illumination assembly 42 includes a printed circuit board 60, a lens array 62 and two targeting LEDs 64a, 64b. The lens array 62 functions as the outer or front panel of the modular camera assembly 20. The term "front panel" will be used interchangeably with the term "lens array" throughout. A plurality of exposure LEDs 66 are disposed on the front surface of printed circuit board 60 to direct illumination through the lens array 62 towards the imaging target area 44. The flexible printed circuit board 63, which route power to the targeting LEDs 64a, 64b, is also electrically coupled to the circuit board 60. The flexible printed circuit board 63 has a central unshaped cut out region 63c to provide clearance for the outer shroud 58a of the shroud assembly 57. The targeting LEDs 64a, 64b, when energized, project targeting illumination through openings 68 in the circuit board 60 and through targeting optics 722, 724 of the lens array 62 to form the crosshairs light or illumination pattern CR which aids in aiming the device 10 at the target dataform 45a, the target signature area 45b, the target item 46a or the target document 46b.

Optic Assembly 43

Figure 15:
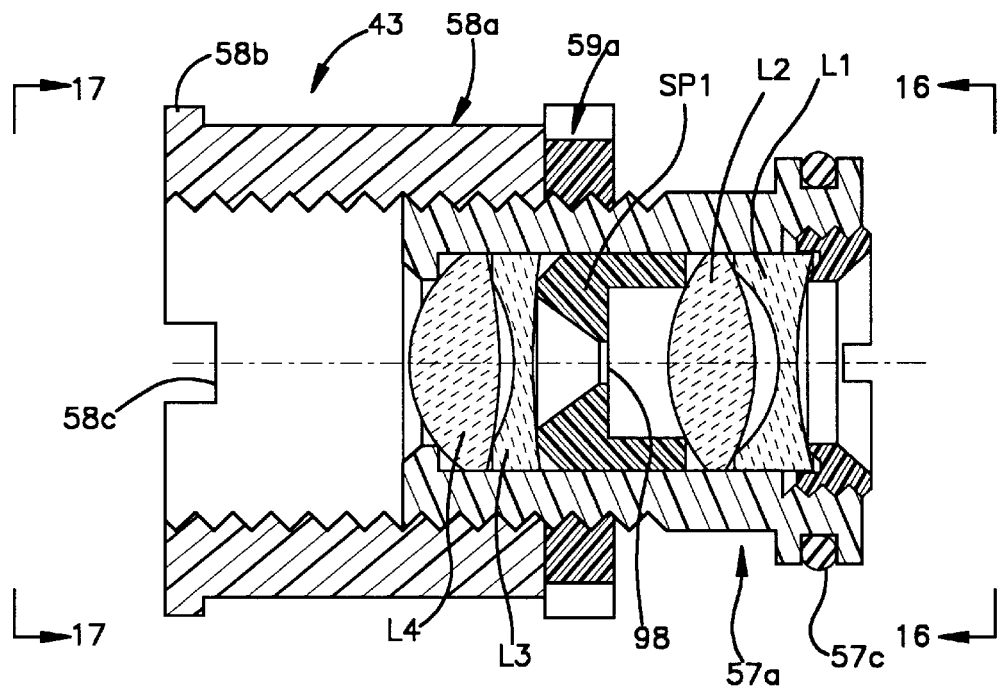
FIG. 15 is a view, partially in side elevation and partially in section of the optic assembly of the modular camera assembly.
Figures 16, 17:
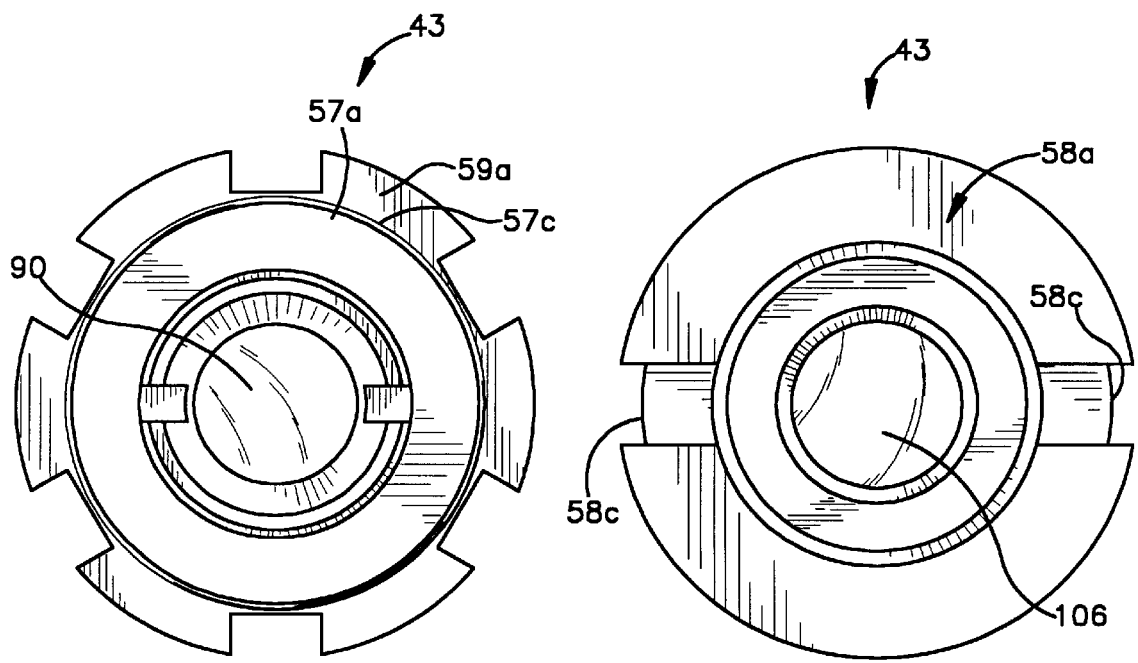
FIG. 16 is a front elevation view of the optic assembly of the modular camera assembly as seen from a plane indicated by the line 16—16 in FIG. 15.
FIG. 17 is a rear elevation view of the optic assembly of the modular camera assembly as seen from a plane indicated by the line 17—17 in FIG. 15.

FIG. 14 shows a cross section of the camera assembly 38 with the optic assembly 43 focusing an image of the imaging target area 44 onto the photosensor array 48. The performance of the portable data collection device 10 is enhanced by the optic assembly 43 which enables imaging and decoding of dataforms with a minimum cell size of 6.6 mil (0.168 mm.). The optic assembly 43 includes a shroud assembly 57 (FIGS. 9 and 15) and a lens assembly LA (FIG. 14). The lens assembly LA includes lenses L1, L2, L3, L4 and a spacer member SP1 with a small central aperture A1 (1.17 mm. in diameter) all supported within an inner cylindrical shroud 57a (best seen in FIG. 9). The lens assembly LA also includes a lens L5 which is supported by an upper surface of the photosensor array IC chip 48a. Thus, there are eleven optic surfaces (including the portion of the spacer member SP1 defining the aperture A1) labeled 90, 92, 94, 96, 98, 100, 102, 104, 106, 108, 110 in FIG. 14. The shroud assembly 57 also includes a lock nut 59a and the outer shroud 58a. The lock nut 59a includes internal threads 59b which thread onto external threads 57b of the inner shroud 57a. When the lock nut 59a is properly positioned on inner shroud threads 57b, the inner shroud 57a is threaded into internal threads 58d of the outer shroud 58a. When assembled, the forward facing surface 59c of lock nut abuts a back surface 60b of the printed circuit board 60. As explained above, the outer shroud 58a is securely held in place by the second support 182 of the upper and lower housing portions 140, 142 thereby insuring a proper perpendicular angle relationship between an optical axis through the optic centers of each of the lenses L1, L2, L3, L4 and the outward facing, light receiving surface 48b of the photosensor array 48.

Additionally, the lock nut 59a facilitates precise positioning of the lenses L1, L2, L3, L4 of the lens assembly LA with respect to the longitudinal displacement of the lenses along an optical axis labeled A—A in FIG. 11. The precise positioning of the lenses L1, L2, L3, L4, L5 with respect to the photosensor array 48 permits the sharpest possible image of the target dataform 45a or target signature area 45b to be directed on the center point CP of the light receiving surface 48b of the photosensor array 48. As can best be seen in FIG. 15, an O-ring 57c is disposed in a annular groove in the outer surface of the inner shroud 57a. The O-ring 57c seals against a central opening 720 of the lens array 62 to prevent external contaminants from entering the interior region 146 of the modular housing 140.

Turning to FIG. 14, based on the distance between the optic assembly 43 and the photosensor array 48, for a given dataform minimum cell size or dimension, there exists a best focus position S2 in front of the forward-most surface 90 of the lens L1 of the optic assembly 43 at which an image of the target dataform 45a (or target signature area 45b) in the imaging target area 44 will be focused sharpest on a center point CP of the light receiving surface 48b of the photosensor array 48. The image sharpness gradually degrades as the target dataform 45 is moved from the best focus position inwardly towards a near field cut off distance S1 or away toward a far field cut off distance S3. At the near field and far field cut off distances S1, S3, the target dataform 45 having the specified minimum cell size is still capable of being decoded. However, at distances less than S1 or greater than S3, the imaging assembly 18 will no longer be able to decode the target dataform 45a.

The horizontal and vertical angular field of view of optic assembly 43 is 32° (horizontal)×24° (vertical). This corresponds to a 40° diagonal field of view. The horizontal angular field of view is shown schematically as an angle labeled with reference number 47 in FIG. 14. Near field and far field cut off distances S1 and S3 are set forth below for a number of different dataform minimum cell sizes. At the S1 and S3 distances, a dataform having the specified minimum cell size can still be decoded by the imaging assembly 18. For a minimum cell size of 15 mil, the S2 best focus working distance is 140 mm. (5.5 in.).

The preferred optic assembly 43 includes four lenses L1, L2, L3, L4 and the plastic spacer member SP1 separating lenses L2 and L3. The lenses L1, L2, L3, L4 and the spacer member SP1 are supported in the inner shroud 57a of the shroud assembly 57. A flat lens L5 is mounted on an upper surface of the photosensor array IC chip 48a and overlies the light receiving surface 48b of the photosensor array 48.

Features of the optic assembly 43 of the imaging assembly 18 include:

| | |
|---|---|
| Field of view | 32° (Horizontal) × 24° (Vertical) |
| | 82 mm. (3.2 in.) × 62 mm. (2.4 in.) at a working distance of 140 mm. (5.5 in.) |
| Minimum decode cell size | 6.6 mil |
| Ambient light | total darkness to full sun light |
| Spectral range | 400–700 nm. |
| Focal length | 8 mm. |
| F-number | 9 |
| Image size | 4.8 mm. (Horizontal) × 3.6 mm. (Vertical) |
| Resolution | MTF > 50% @ 50 cyc/mm |
| Distortion | 1% |

Image size refers to the size of the image projected onto the photosensor array light receiving surface 48b.

The working range of the optic assembly 43 with respect to reading 15 mil. dataforms is as follows:

| Cell size Rotation | Min. working distance S1 | Max working distance S3 | Pitch | Skew |
|---|---|---|---|---|
| 15 mil | 65 mm. (2.5 in.) | 290 mm. (11.5 in.) | 15° | 15° 360° |

The field of view or imaging target area 44 of the optic assembly 43 at the best focus distance S2 of 140 mm. (5.5 in.) and at the minimum and maximum working distances S1, S3 are as follows:

| Distance | Width | Height |
|---|---|---|
| S1 | 37 mm. (1.5 in.) | 28 mm. (1.1 in.) |
| S2 | 82 mm. (3.2 in.) | 62 mm. (2.4 in.) |
| S3 | 166 mm. (6.5 in.) | 123 mm. (4.9 in.) |

The optic prescriptions for each of the optic surfaces of the optic assembly 43 are as follows:

| Optic Surface | Radius of Surface Curvature | Diameter | Shape |
|---|---|---|---|
| 90 | 10.093 mm. | 7 mm. | Concave |
| 92 | 3.635 mm. | 7 mm. | Concave |
| 94 | 6.995 mm. | 7 mm. | Convex |
| 96 | 5.834 mm. | 7 mm. | Convex |
| 98 (Flat) | Infinity - Pinhole diameter 1.171 mm. | 7 mm. | Flat |
| 100 | 25.116 mm. | 7 mm. | Concave |
| 102 | 5.834 mm. | 7 mm. | Concave |
| 104 | 13.499 mm. | 7 mm. | Convex |
| 106 | 4.325 mm. | 7 mm. | Convex |
| 108 (Flat) | Infinity | 7 mm. | Flat |
| 110 (Flat) | Infinity | 7 mm. | Flat |

The distance between successive optical surfaces 90–110 is as follows:

| Optic Surface | Distance |
|---|---|
| 90–92 | 0.529 mm. |
| 92–94 | 0.609 mm. |
| 94–96 | 2.389 mm. |
| 96–98 | 1.714 mm. |
| 98–100 | 2.114 mm. |
| 100–102 | 0.599 mm. |
| 102–104 | 0.366 mm. |
| 104–106 | 2.482 mm. |
| 106–108 | 7.27 mm. |
| 108–110 | 0.60 mm. |
| 110–Photosensor | 1.31 mm. |

Where "Photosensor" is the light receiving surface 48b of the photosensor array 48. The glass type for each lens L1, L2, L3, L4, L5 of the lens assembly LA is as follows:

| Lens | GLASS TYPE | REFRACTIVE INDEX |
|---|---|---|
| L1 | SF5 Schott | 1.67270 |
| L2 | RAFD13 Hoya | 1.85540 |
| L3 | SF11 Schott | 1.78472 |
| L4 | LAK21 Schott | 1.64050 |
| L5 | BK7 Schott | 1.51289 |

The lenses L1, L3, L4, L5 are available from Schott Glass Technologies, Inc. of Duryea, Pa. The lens L2 is available from Hoya Corp USA, Optics Division located in San Jose, Calif.

Illumination Assembly 42

Because the desired working range and field of view of the portable data collection device 10 dictates that the optic assembly 43 have a large F number (F#9), the illumination assembly 42 must provide adequate illumination of the imaging target area 44 during the exposure period so that enough reflected light is absorbed by the photosensor array 48 to generate a suitably bright image. However, the exposure period is normally limited to 0.01 seconds or less to minimize the smear effect of an operator's hand jittering during a dataform reading session. Therefore, the illumination assembly 42 must provide adequate illumination to accommodate the large F# and short exposure time.

The printed circuit board assembly 60 includes a plurality of surface mount exposure illumination LEDs 66. A single piece acrylic or polycarbonate lens array 62, preferably fabricated of PMMA (polymethyl methacrylate), is positioned between the printed circuit board assembly 60 and the target area 44 (FIGS. 8 and 9) for directing the illumination from the exposure LEDs 66 towards the target area 44.

The illumination LEDs 66, which are set out in four banks of four LEDs, emit a red color light to illuminate the imaging target area 44. Suitable red surface mount LEDs are available as Part No. MTSM735K-UR or MTSM745KA-UR from MarkTech Corporation of Latham, N.Y.

Figure 10:
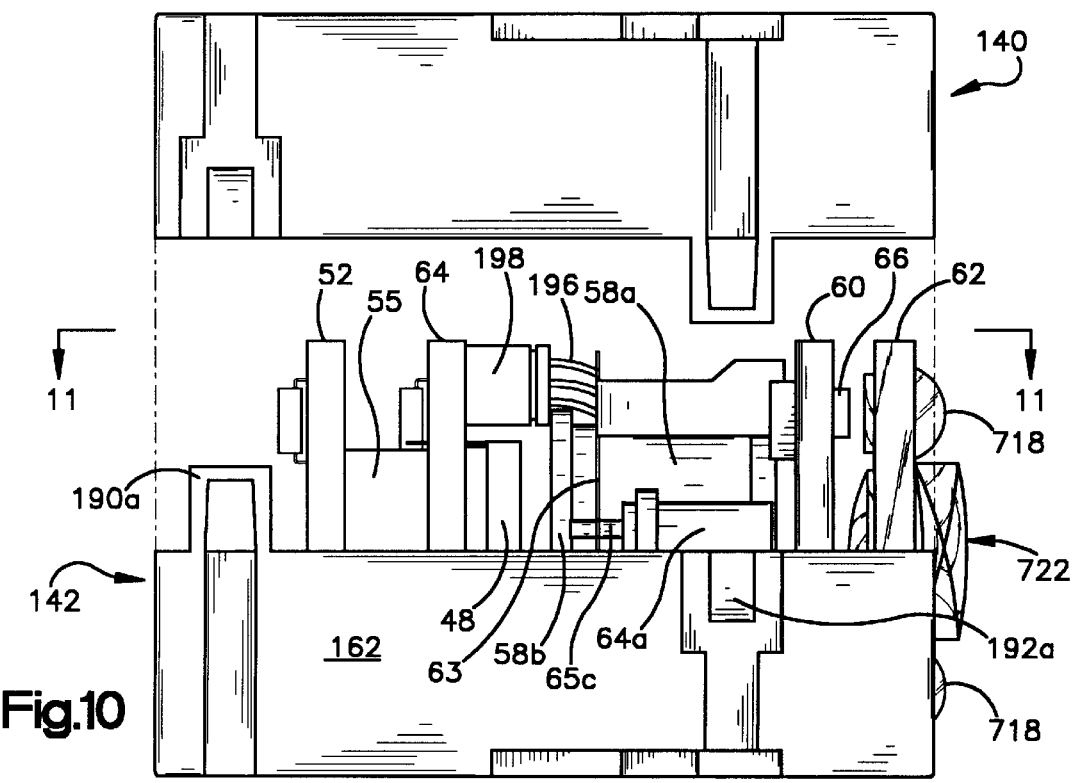
FIG. 10 is a side elevation view of the modular camera assembly of FIG. 8 with an upper half of the housing removed.

As can be seen in FIG. 10 with respect to the previously described lens array 62, the lens array 62 functions as a front panel for the modular portion 20 of the imaging assembly. The printed circuit board assembly 60 includes printed conductors and conductive leads 196 including a power lead operative for supplying power to the illumination LEDs 66. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totaling sixteen illumination LEDs providing at least 4560 mcd of uniform illumination over the target area 44 at the best focus distance S2. A central opening 67 in the printed circuit board assembly 60 provides an opening for the shroud assembly 58 to extend through.

The lens array 62 includes four illumination optic portions 708a, 708b, 708c, 708d (FIG. 9 and 18) each of which are aligned with a corresponding bank of illumination LEDs 66. The illumination optic portions 708a, 708b, 708c, 708d direct a 68 degree angular illumination field from each illumination LED 66 into a uniform field having an angular field of view horizontally and vertically which substantially corresponds to the angular field of view horizontally and vertically of the optic assembly 43 which defines the imaging target area 44.

Figure 23:
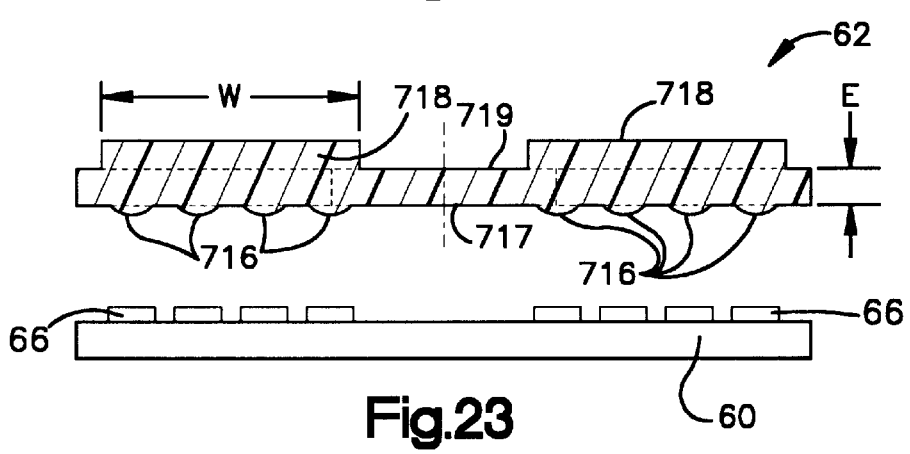
FIG. 23 is a sectional view of the front panel of FIG. 32 as seen from a plane indicated by the line 23—23 in FIG. 21.
Figures 24, 25:
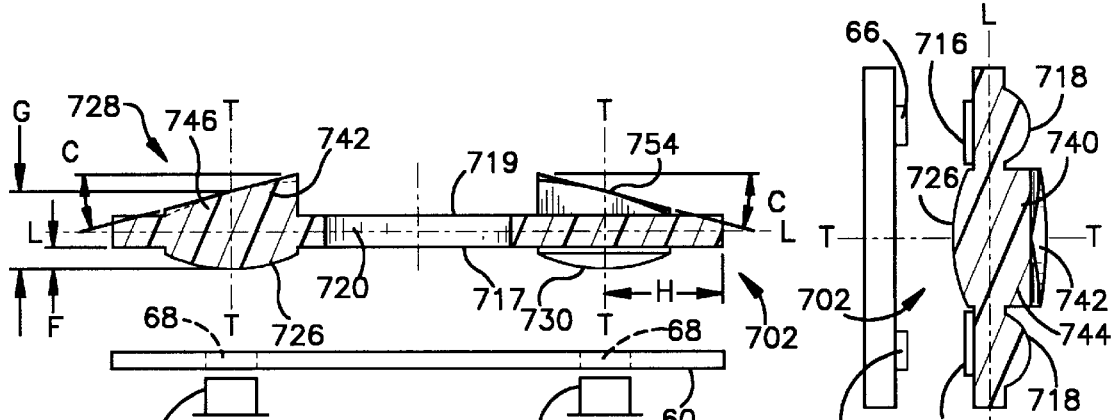
FIG. 24 is a sectional view of the front panel of FIG. 19 as seen from a plane indicated by the line 24—24 in FIG. 21.
FIG. 25 is a sectional view of the front panel of FIG. 19 as seen from a plane indicated by the line 25—25 in FIG. 21.

Referring to FIGS. 23 and 25, which show a horizontal cross section (FIG. 23) and a vertical cross section (FIG. 25) through the illumination optic portions 708a, 708b, 708c, 708d, it can be seen that each optic portion comprises a lens including four vertically oriented cylindrical entry optic surfaces 716 extending from a back side 717 (FIG. 23) of the lens array 702. One vertically oriented cylindrical entry surface 716 is positioned in front of a corresponding LED 66.

Each optic portion 708a, 708b, 708c, 708d also includes a horizontally oriented cylindrical optic exit surface 718 extending from a front side 719 (FIG. 34) of the lens array 62. One horizontally oriented cylindrical exit optic surface 718 is positioned in front of each bank of four LEDs 66.

Figure 21:
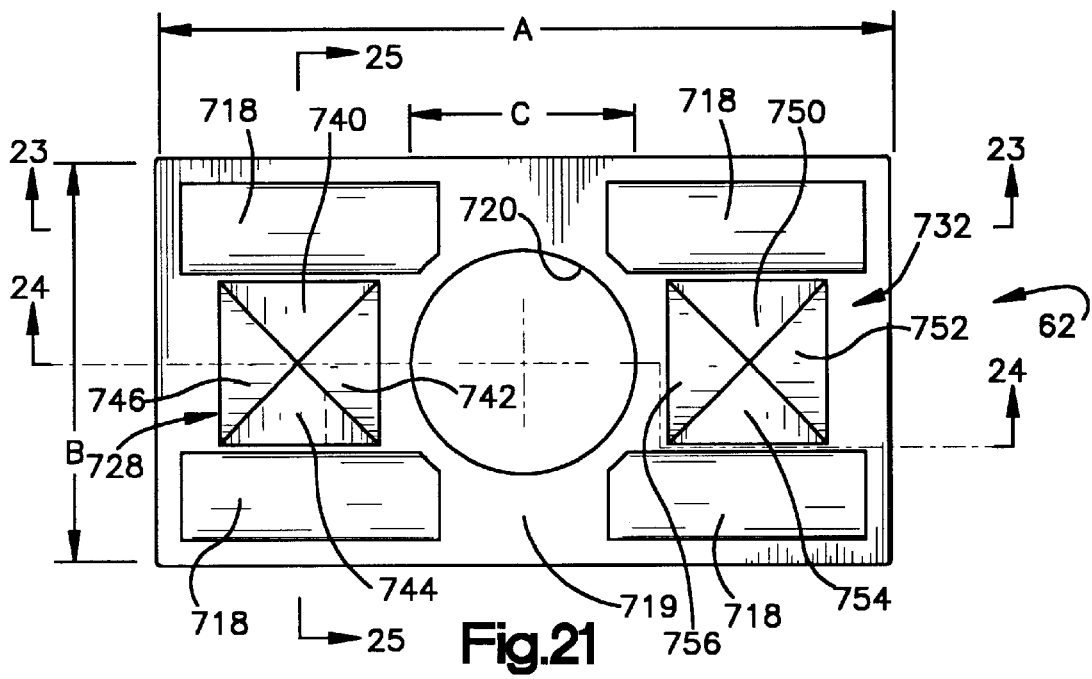
FIG. 21 is a front elevation view of the front panel of FIG. 19.
Figure 22:
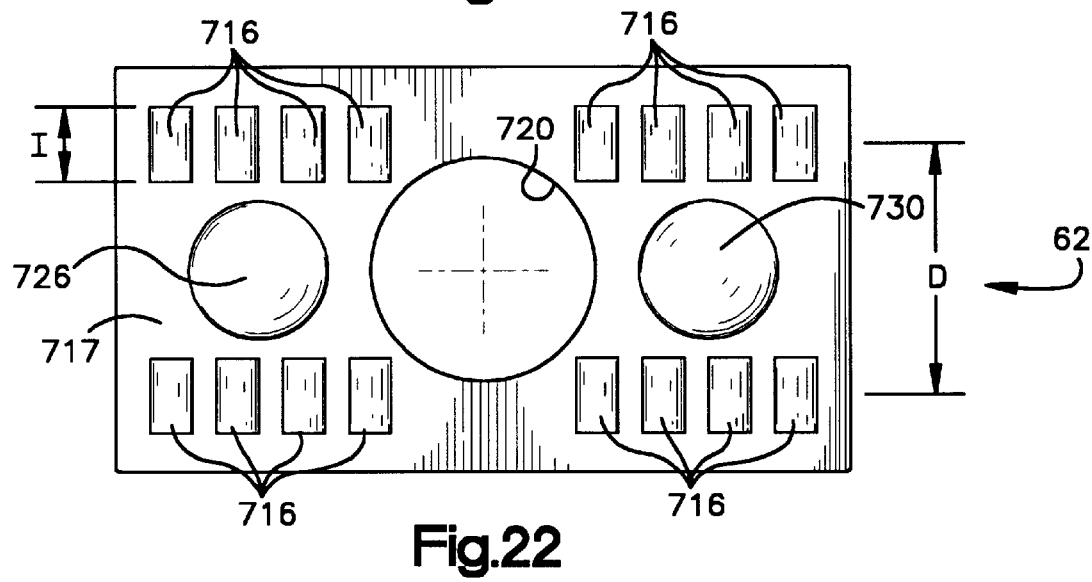
FIG. 22 is a back elevation view of the front panel of FIG. 19.

The vertically oriented cylindrical entry optic surfaces 716 define the horizontal field of illumination and the horizontally oriented cylinders 718 define the vertical field of illumination. This arrangement provides an even illumination intensity distribution across the target area 44. The 4560 mcd of illumination provided by the illumination LEDs 66 will provide an illumination intensity in excess of 106 lux at the far field cut off distance S3 of 290 mm. (11.5 in.) for 15 mil minimum cell size dataforms. The vertically oriented entry surfaces 716 have a radius of curvature of 1.50 mm. and a height I (FIG. 35) of 4.00 mm. while the horizontally oriented exit surfaces 718 have a radius of curvature of 3.0 mm. and a width J (FIG. 36) of 13.75 mm. Referring to FIGS. 21–23, suitable dimensions for the lens array 702 are as follows:

| Label | Description | Dimension |
|-------|-------------|-----------|
| A | Height of lens array 62 | 21.75 mm. |
| B | Width of lens array 62 | 39.55 mm. |
| C | Diameter of center opening 720 of lens array 62 | 12.00 mm. |
| D | Height between middle of vertical entry surfaces 716 | 14.13 mm. |
| E | Thickness of lens array 62 | 1.95 mm. |

Referring again to FIG. 18, the illumination assembly 42 also includes a targeting arrangement or assembly to aid in aiming the device 10 at the target dataform 45a, the target signature area 45b or the target item 46a or target document 46b. The targeting assembly includes the targeting LED illuminators 64a, 64b, which extend into apertures 68, 70 in the printed circuit board assembly 60 and, when energized, project illumination into first and second targeting optics 722, 724 respectively of the lens array 62. The first and second targeting optics 722, 724 are mirror images of each other and are identical in configuration. Each targeting optic generates a crosshair pattern of illumination CR1, CR2 (seen in FIGS. 18 and 26) and, as will be discussed below, if the target dataform 45a is at a proper distance for imaging, i.e., at the best focus position S2 of the optic assembly 43, the crosshairs CR1, CR2 will coincide or overlap producing a single rectangular crossing or crosshair pattern of illumination CR (FIGS. 18 and 26). The rectangular illumination pattern CR will have a height h of 62 mm. (2.4 in.) and a width w of 82 mm. (3.2 in.) (FIG. 18) at the best focus position S2 (140 mm.). The rectangular illumination pattern CR substantially corresponds to the target area of the optic assembly 43 at the best focus position S2. Of course, the rectangular illumination pattern CR will not be a perfect intersecting line crosshair but rather will be characterized by an illumination intensity distribution or pattern having some visible "thickness" t (FIG. 18), but will nonetheless be suitable for aiming the device 10.

The first and second targeting optics 722, 724, which are identical in configuration, are shown in cross section in FIGS. 24 and 25. The first targeting optics 722 comprises a lens with an aspherical light entry optic surface 726 and a segmented cylindrical light exit optic surface 728. The second targeting optics 724 comprises a lens with an aspherical light entry optic surface 730, similar to the aspherical light entry optic surface 726, and a segmented cylindrical light exit optic surface 732, similar to the segmented cylindrical light exit optic surface 728.

The aspherical entry surfaces 726, 730 each have a diameter of 8 mm., a radius of curvature of 2.890 mm. and a conic constant of −2.534. The segmented cylindrical light exit surfaces 728, 732 each have an 8.0 mm. by 8.0 mm. square shaped outer perimeter. The segmented cylindrical surface 728 is comprised of four triangular shaped sections 740, 742, 744, 746 (FIG. 21) while the segmented cylindrical surface 732 is divided into four triangular shaped sections 750, 752, 754, 756, wherein the optic surfaces of sections 740 and 750 are identical, the optic surfaces of sections 742 and 752 are identical, the optic surfaces of sections 744 and 754 are identical and the optic surfaces of sections 746 and 756 are identical.

Upper and lower triangular sections 740, 744 comprise vertically oriented cylindrical light exit optic surfaces. Left and right triangular sections 742, 746 comprise horizontally oriented cylindrical light exit optic surfaces. Similarly, upper and lower triangular sections 750, 754 comprise vertically oriented cylindrical light exit optic surfaces, while left and right triangular sections 752, 756 comprise horizontally oriented cylindrical light exit optic surfaces. The vertically oriented cylindrical optic surfaces 740, 744, 750, 754 have a radius of curvature of 25.00 mm. Similarly, the horizontally oriented cylindrical optic surfaces have a radius of curvature of 25.00 mm.

As can best be seen in FIG. 24, the horizontally and vertically oriented cylindrical optic surfaces 742, 746, 740, 744 are tipped at an angle c with respect to a longitudinal axis L—L though the lens array 62 and, therefore, is also tipped at an angle c with respect to the target area 44. The tip angle c of the horizontally oriented cylindrical optic surfaces 742, 746 shifts the horizontal position of the illumination rectangle or targeting crosshair CR1 (schematically shown in FIG. 18) generated by the first targeting optics 722 such that it is horizontally centered in the target area 44 while the tip angle c of the vertically oriented cylindrical optic surfaces 740, 744 shifts the vertical position of the targeting crosshair CR1 generated by the first targeting optics 722 such that it is vertically centered in the imaging target area 44. A suitable tip angle of c is 9.83 degrees.

Similarly, as can also be seen in FIG. 24, the horizontally and vertically oriented cylindrical optic surfaces 752, 756, 750, 754 are also tipped at an angle c which is preferably 9.83 degrees with respect to a longitudinal axis L—L though the lens array 62. Note that the direction of tilt of the segmented cylindrical light exit surfaces 728, 732 are the same in magnitude but opposite in a direction of tilt, that is, the light exit surface 728 of the first targeting optics 722 slants downwardly to the left toward the front side 719 in FIG. 24, while the light exit surface 732 of the second targeting optics 724 slants downwardly to the right toward the front side 719 in FIG. 37. Also note that the two horizontally oriented light exit optic surfaces 718 which would be seen in FIG. 24 have been removed for clarity of the drawing. It should also be noted that FIG. 20 which shows the segmented cylindrical light exit surface 732 as being comprised of four individual exploded "pieces" is only a representation to provide additional clarity as to the shape and tilt of the four light exiting surfaces 750, 752, 754, 756. The lens array 62 is fabricated as a single piece and the targeting optics 722, 724 and illumination optics 716, 718 are formed in the single piece. The lens optics are not fabricated by "piecing" together individual optics as might be assumed in looking at FIG. 20.

Additional suitable dimensions, labeled on FIG. 24, for the aspheric light entry surfaces 726, 730, the segmented cylindrical light exit surfaces 728, 732 of the lens array 702 are as follows

| Label | Description | Dimension |
| --- | --- | --- |
| F | Maximum extension of aspheric light exit surfaces 726, 730 from back side 717 of lens array | 1.75 mm. |
| G | Distance between maximum extension of aspheric light exit surfaces 726, 730 and center of respective segmented light exit surfaces 728, 732 along centerlines T-T | 5.25 mm. |
| H | Distance between centerlines T-T and outer edge of lens array 62 | 7.80 mm. |

Targeting Illumination Crosshairs CR1, CR2

As noted above, the best focus distance S2 is 140 mm. (5.5 in.). If the device 10 is oriented such that the lens array 62 is substantially parallel to a surface of the target dataform 45a, the target signature area 45b, the target item 46a or the target document 46b and positioned at the best focus distance S2 from the target, then the targeting crosshairs CR1 and CR2 will coincide and generate the single targeting crosshair CR as shown in FIG. 26 having an approximate height h of 62 mm. (2.4 in.) and an approximate width w of 82 mm. (3.2 in.) which substantially corresponds to the target area 44 height of 62 mm. and width of 82 mm. at the best focus position S2 of 140 mm. (5.5 in.) in front of the optic surface 90 of lens L1.

If the device 10 is moved away from the best focus distance S2 with respect to the target dataform 45a, the targeting crosshairs CR1 and CR2 will separate horizontally as shown in FIG. 27 thereby informing the operator that the distance of the device 10 from the target dataform 45a or target signature area 45b is not correct for best imaging or imaging and decoding. Finally, if the lens array 62 is not substantially parallel to a surface of the target dataform 45a, that is, the device 10 is tilted forward or backward from a position where the front surface 717 of the lens array or front panel 62 is parallel to the target surface, the vertical portions of the illumination patterns of CR1 and CR2 will be angularly shifted or displaced as shown in FIG. 28, the greater the angle of tilt of the device 10, the greater will be the angular shifting of the vertical portions of the illumination patterns CR1, CR2.

As was noted above, the targeting LEDs 64a, 64b are turned off by the imaging assembly circuitry 18 during capture of an image frame to reduce possible image distortion caused by glare from the targeting LEDs reflecting off the target object, that is, the target dataform 45a, the target signature area 45b, the target item 46a or the target document 46b. In an alternate embodiment, in addition to turning off the targeting LEDs 64a, 64b, the four banks of illumination LEDs 66 may be sequentially energized instead of being simultaneously energized to further reduce glare from the target object in the imaging target area 44 of the optic assembly 43. That is at any given point in time, only one bank of illumination LEDs would be energized. After a short predetermined time period, the presently energized bank would be turned off and another bank would be energized for the predetermined time period. In this manner each bank would be energized sequentially, being energized ¼ of the time and off ¾ of the time. Sequential illumination of the four banks of two illumination LEDs 66 will have the effect of reducing the overall level of illumination of the imaging target area 44 while still providing for uniformity in illumination throughout the target area.

In other operating embodiments, the sequence of energization may be varied so that at any point in time more than one LED bank is energized, for example, sequencing of energization of the LED banks could be altered such that two or three banks of LEDs are energized at any given point in time.

Image Processing of the Imaging Assembly 18

Figure 29A:
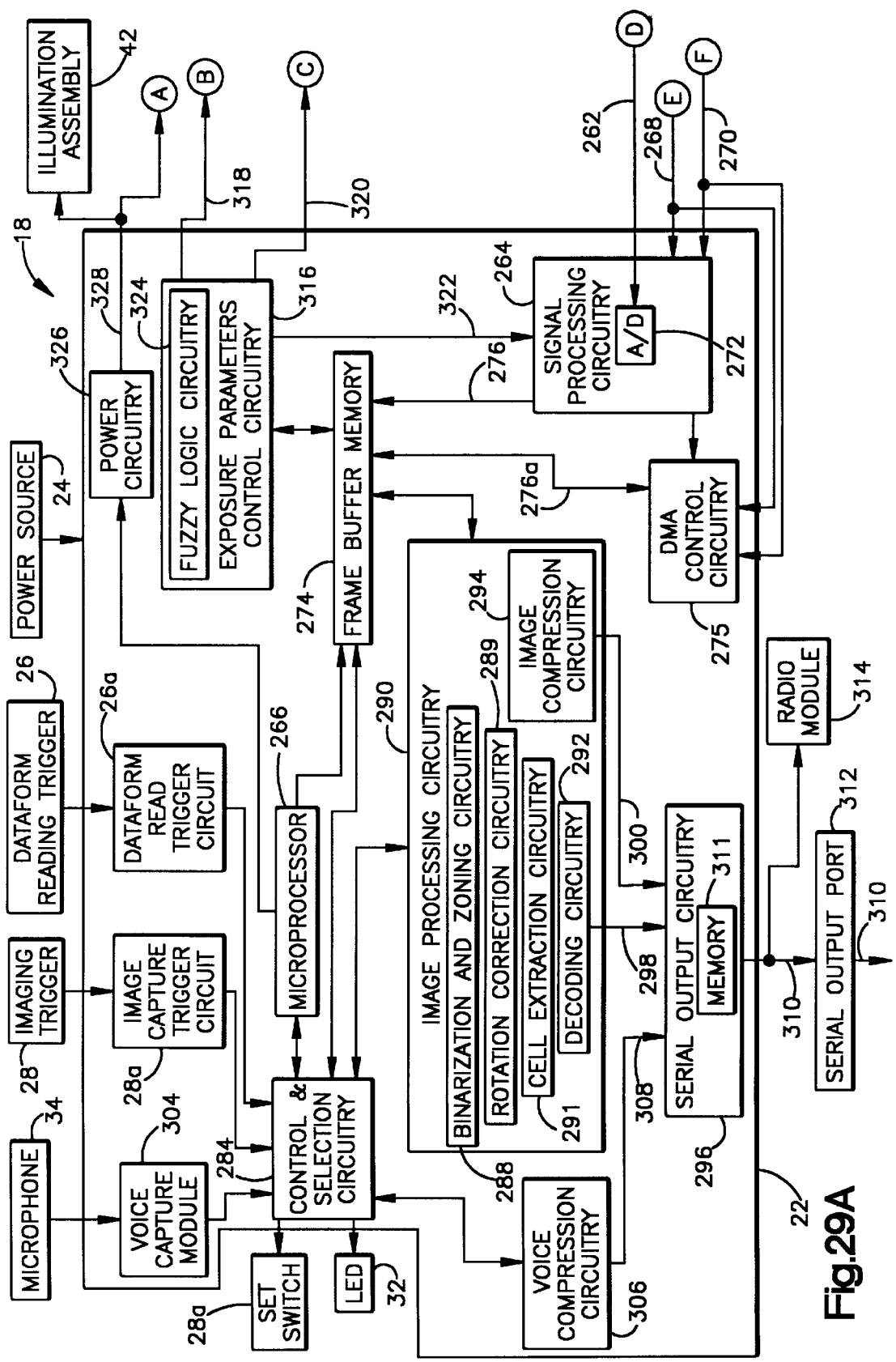
FIG. 29A is one portion of a block diagram of selected circuitry of the portable data collection device of the present invention.
Figure 29B:
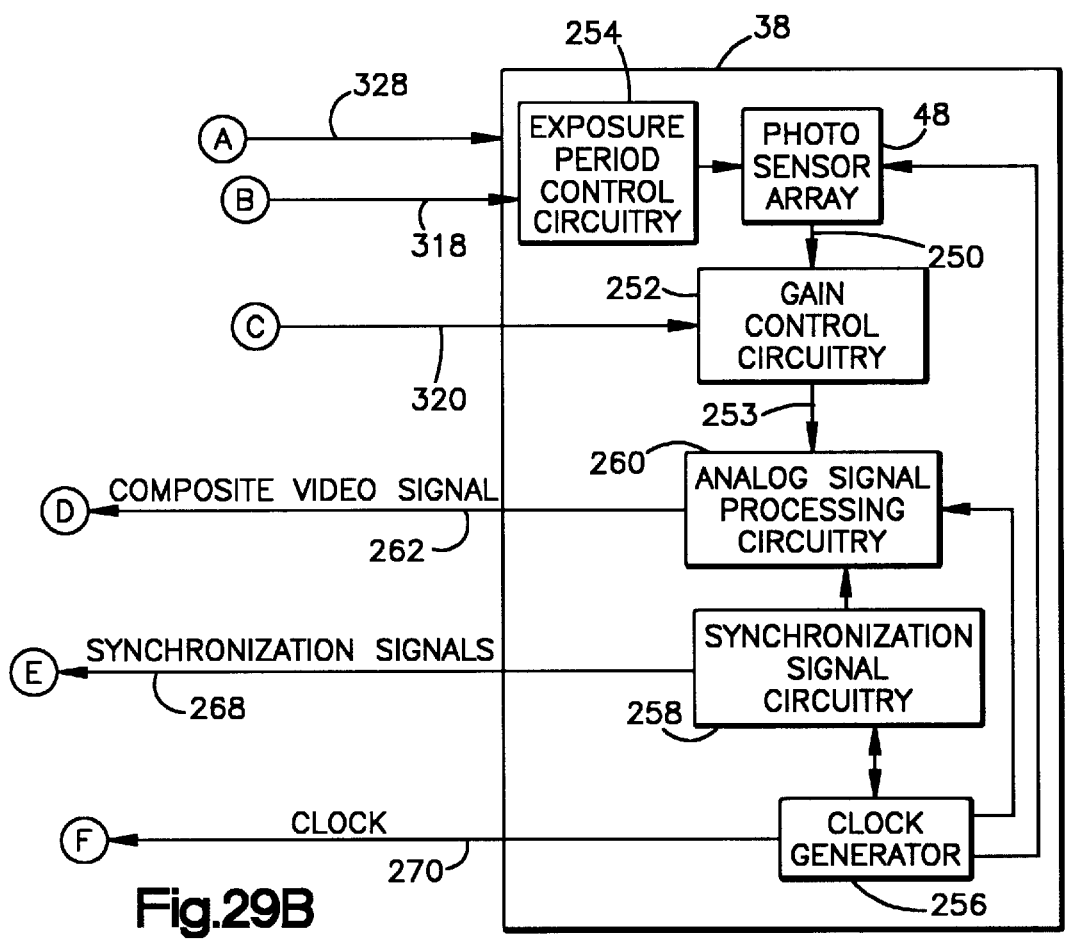
FIG. 29B is a second portion of a block diagram of selected circuitry of the portable data collection device of the present invention, the second portion matching the first portion shown in FIG. 17A.

In the preferred embodiment of the portable data collection device of the present invention, the photosensor array 48 is part of the board camera assembly 38 commercially available from such vendors as Sharp or Sony of Japan. Referring to FIGS. 29A and 29B, the camera assembly 20, when activated, generates a composite video signal 262. The board camera assembly 38 also includes a clock generator 256, synchronization signal circuitry 258 and analog signal processing circuitry 260 for reading illumination intensity values out of each photosensor of the photosensor array 48 and generating the composite video signal 262.

The intensity of light incident on individual pixels or photosensors of the photosensor array 48 varies somewhat uniformly from very bright (whitest areas of the image) to very dark (darkest areas of the image). The preferred 2D photosensor array 48 comprises an interlaced 752 by 582 matrix array of photodiode photosensors or image pixels (for a total of 437,664 pixels). The clock generator 256 coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 250 wherein temporal portions of the voltage signal represent the changes accumulated on each photosensor. One CCD element is provided for reading out the charges on two photosensors thus two read outs of the photosensor array comprise one full image frame, the frame being comprised of two interlaced fields.

The camera assembly 38 generates the composite analog video signal 262 (FIG. 29A) corresponding to consecutive fields of the image incident on the photosensor array 48. The video signal 262 is termed "composite" because it includes synchronization signals generated by the synchronization signal circuitry 258 which correlate portions of the video signal to particular photosensors, interspersed among image signal portions wherein the signal magnitude represents charges on individual photosensors read out from a given row of the photosensor array 48.

The board camera assembly 38 also includes gain control circuitry 252 for controlling amplification of the image signal 253 and exposure period control circuitry 254 for controlling a duration of an exposure period of the pixels. Both the exposure period control circuitry 254 and the gain control circuitry 252 are controlled by exposure parameters control circuitry 316 including fuzzy logic circuitry 324.

The synchronization signals 268 generated by synchronization signal circuitry 258, the clock signal 270, generated by the clock generator 256, and the composite video signal 262 are output to signal processing circuitry 264 on the control and decoder board 22. Because the signal processing circuitry is configured to receive a composite video signal, it should be appreciated that selection of the board camera assembly 38 and its accompanying components for generating the composite video signal are not critical to the present invention.

Under the control of a microprocessor 266 mounted on the control and decoder board 22, the video signal 262 is input to the signal processing circuitry 264 along with clocking signals 268 and synchronization signals 270. The signal processing circuitry 264 includes synchronization extractor circuitry which receives the clocking signals 268 and the synchronization signals 270 and generates signals which are coupled to analog to digital converter circuitry (A/D converter circuitry) 272 causing the A/D converter circuitry to periodically digitize the video signal 262. The A/D converter circuitry 272 includes an A/D converter generating an 8 bit value representing the illumination incident on a pixel of the array.

Direct memory access (DMA) control circuitry 275 receives the synchronization signals 270 and clock signals 268 and generates address signals 276a coupled to the frame buffer memory 274 to indicate a storage location for each value generated by the A/D converter circuitry 272. Data signals 276 representing the values generated by the A/D converter circuitry 272 are coupled to the frame buffer memory 274.

The microprocessor 266 also controls operation of control and selection circuitry 284 and image processing circuitry 290 which are mounted on the control and decoder board 22. Coupled to the control and selection circuitry 284 are the dataform read trigger circuit 26a which, in turn, is coupled to the dataform reading trigger 26 and an image capture trigger circuit 28a which, in turn, is coupled to the imaging trigger 28. Additionally, the set switch 28a is coupled to the control and selection circuit.

The exposure parameters control circuitry 316 which outputs control signals 318, 320 to the exposure period control circuitry 254 and the gain control circuitry 252 of the camera assembly 38 and a signal 322 embodying an appropriate set of reference voltages for operating the A/D converter 272. The exposure parameters control circuitry 316 includes the fuzzy logic circuitry 324 which analyzes captured frames of data accessed from the frame buffer memory 274. The fuzzy logic circuitry 324 analyzes a captured frame to determines if the current exposure period of the 2D photosensor array 48, the current amplification of the video signal 250 by the gain control circuitry 252 and the reference voltages used by the A/D converter circuitry 272 are resulting in an "acceptable" captured image frame. If not, the control signal 318 is changed to adjust the exposure period of the 2D photosensor array 48 and/or the control signal 320 is changed to adjust the amplification of the video signal 250 and/or the signal 322 is changed to adjust the operation of the A/D converter circuitry 272. After the adjustment, another captured frame is analyzed by the fuzzy logic circuitry 324 and, if necessary, further adjustments are made in an iterative fashion until the camera assembly 32 produces an "acceptable" captured image. A suitable exposure parameter control circuit including fuzzy logic control circuitry is disclosed in application Ser. No. 08/544,618, which has previously been referenced.

A frame buffer memory 272 is provided to store digital gray scale values (represented by line 276 in FIG. 29A) generated by the A/D converter circuitry 272 from the composite video signal 262. The gray scale values are processed by image processing circuitry 290. The image processing circuitry 290 includes binarization and zoning circuitry 288, rotation correction circuitry 289, cell extraction circuitry 291, decoding circuitry 292 and image compression circuitry 294.

As can be seen in FIGS. 14 and 29A, the power source 24 is coupled to the control and decoder board 22 to provide operating power to the microprocessor 266 and other circuitry mounted on the board and the radio module 314 operating under the control of the microprocessor 266. Power circuitry 326, also operating under the control of the microprocessor 266 is coupled through a lead 328 to the illumination assembly 42 and the camera assembly 38 to supply power to these components of the imaging assembly 18.

As can best be seen in FIGS. 29A and 29B, the imaging assembly 18 includes the camera board assembly 38 of the modular camera assembly 20 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 5) mounted on the control and decoder board 22 and operated by the microprocessor 266. Alternately, the circuitry of the imaging assembly 18 may comprise separate application-specific integrated circuitry (ASIC) mounted on the control and decoder board 22.

As noted above, the portable data collection device imaging assembly 18 is functions in three modes—a dataform reading mode and two imaging modes. The dataform reading mode is commenced upon actuation of the dataform reading trigger 26. The position of set switch 28a determines in which of the two imaging modes the imaging assembly 18 operates when the imaging trigger 28 is actuated. If the two position set switch 28a is in the position shown in FIG. 1, the imaging assembly 18 functions to identify and capture a binarized representation of a signature area within an image frame generated by the imaging assembly. The binarized data corresponding to the signature area is then stored in the memory 288 for later downloading via the serial port 312 or transmitted to the radio module 314 for rf communication to a remote host computer (not shown).

On the other hand, if the set switch 28a is in the other of its two positions, the imaging assembly 18 operates in the normal imaging mode. In the normal imaging mode the gray scale values corresponding to a captured image frame are compressed and stored in the memory 288. There are two operating embodiments of the normal imaging mode illustrated in FIGS. 31 and 32 respectively. In a first operating embodiment of the normal imaging mode, depressing the imaging trigger 28 causes compressed gray scale data corresponding to one captured image frame to be stored the memory 288. In a second operating embodiment of the normal imaging mode, depressing the imaging trigger 28 causes compressed gray scale data corresponding to successive image frames of the imaging target area 44 to be captured and stored in the memory 288.

MODE I
Signature Area Capture Imaging Operating Mode

If the set switch 28a is in the position shown in FIG. 1 and the operator depresses the imaging trigger 28, the control and selection circuitry 284, operating under the control of the microprocessor 266, causes actuation of the board camera assembly 38. The board camera assembly 38 generates the composite video signal 262. As explained above, the composite video signal 262 is input to the signal processing circuitry 264 along with clocking signals 268 and synchronization signals 270. The signal processing circuitry 264 digitizes the video signal 262 generating a set of 8 bit gray scale data values representing an image frame, that is, the integration of the intensity of reflected light focused on each of the 439,168 photosensors over an exposure period. Data signals (shown representatively at 276 in FIG. 29A) representing the gray scale values of the captured image frame are stored in the frame buffer memory 274.

Binarization of Gray Scale Values of Captured Image Frame

Binarization of a captured image frame involves converting each image pixel gray scale value of a captured image frame into binary values. An image pixel is assigned either a value of one (1) representing a black image pixel or a value of zero (0) representing a white image pixel. It should be appreciated that the processing operations described herein are performed on data stored in the frame buffer memory 274 and that the constructs and processing operations (e.g., the imaging target area 44 being divided up into processing windows) described are virtual. In reality, the binarization, zoning and compression procedures described herein result in manipulation of data values stored in the memory 274 not physically "dividing up" of the target image area into a plurality of processing windows. However, the description herein sets forth the underlying theory and those skilled in the art will appreciate that physical implementation of the binarization, zoning and compression may be made in any desired combination of circuitry, software, firmware, ASICs, PLCS, microprocessor(s), etc.

Figure 41:
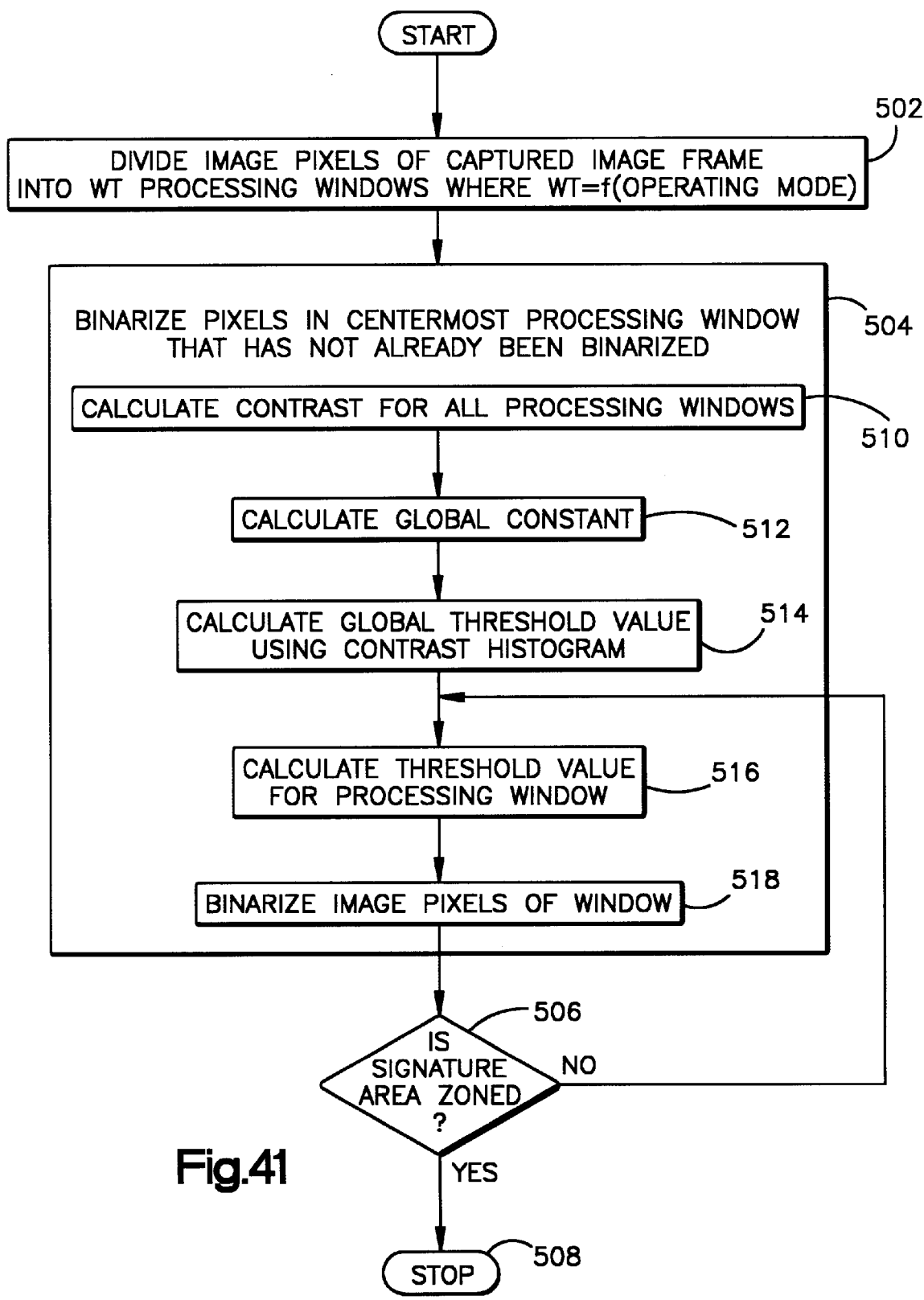
FIG. 41 is a flow chart of the binarization and zoning process.

FIG. 41 is a schematic representation of a simplified flow chart of the binarization and zoning process. At step 520, the binarization and zoning circuitry 288 divides the image pixels corresponding to a captured image frame into equal size processing windows, W. Imaging a signature area for later identification of the writer's signature does not require the degree of resolution that a reading a small 2D dataform would require, therefore, the total number of processing windows, WT, may advantageously be a less in the signature area capture mode than in the dataform reading mode. The smaller the total number of processing windows, WT, the greater the number of image pixels per window and the less window processing time is required. However, as the number of processing windows is increased, all other things being equal, the greater the definition and resolution of the resulting binarized image of the imaging target area 44.

The binarization and control circuitry 288 is programmed to change window processing size based on whether the imaging assembly 18 is operated in the signature area capture mode or the dataform reading mode, that is, WT is a function of the operating mode of the imaging assembly (WT=f (Operating mode)). Upon actuation of the imaging assembly 18 by the operator 105, control signals generated by the control and selection circuitry 284 are coupled to the image processing circuitry 290. If the selected mode of operation is either the signature area capture mode or the dataform reading mode, the binarization and zoning circuitry 288 is actuated. Depending on the control signals, that is, depending on the selected mode, the binarization and zoning circuitry 288 implements a processing window size that is appropriate for the selected mode of operation.

A typical value for the total number of processing windows, WT, in the signature area capture mode is 100, while in the dataform reading mode, a typical value for the total number of processing windows, WT, is 58×75=4350. For WT=100 (the signature area capture mode), the size of each window is 58×75=4350 image pixels. For WT=4350 (dataform reading mode), the size of each window is 10×10= 100 image pixels.

Figure 33C:
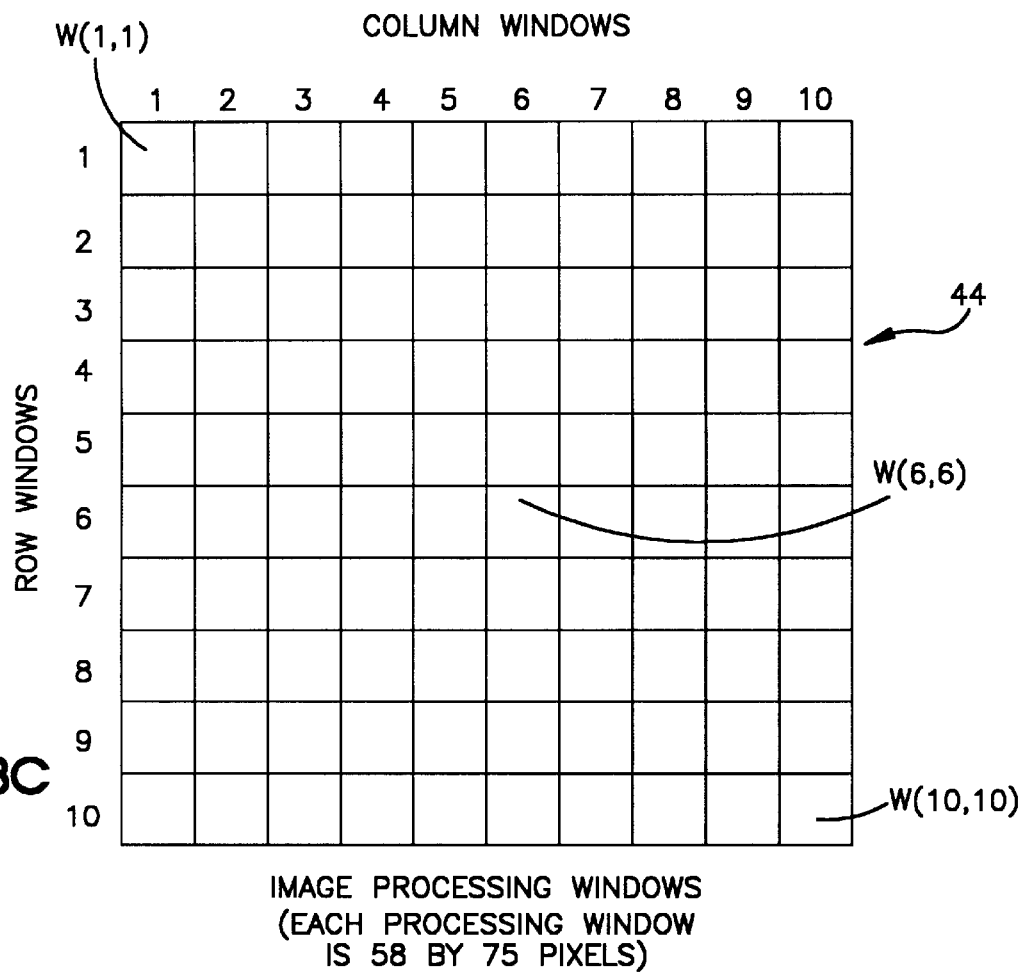
FIG. 33C is a presentation of processing windows comprising sets of image pixels.

As can be seen in FIG. 33C, in the signature image capture mode, there are WT=100 processing windows resulting from dividing 580 of the 582 row image pixels into 10 row windows (win(i)=10) and dividing 750 of the 752 column image pixels into 10 column windows (wine)=10). The outer perimeter two pixel rows and two pixel columns are ignored. Let W(p,q) represent the processing window corresponding to the pth row window and the qth column window. Symbolically, the matrix of processing windows, W(p,q), can be represented as follows:

$$W(p,q); p=1, 2, \ldots, \text{win}(i); q=1, 2, \ldots, \text{win}(j)$$

In the example illustrated in FIG. 33C, win(i)=win(j)=10 and the size of each processing window W(p,q) is 58 pixels (580/10) by 75 pixels (750/10=75) pixels or a total of 4,350 pixels.

Window processing by the binarization and zoning circuitry 288 works by window from the center of the imaging target area 44 outwardly. As will be explained below, this is the most efficient way of identifying the imaged target signature area 45b (or imaged target dataform 45a if operating in the dataform reading mode). This center out method of window processing assumes that the operator 105 has correctly "aimed" the device 10 at the target signature area 45b such that the imaged signature area is approximately in the center of the imaging target area 44. Thus, at step 504, the binarization and zoning circuitry 288 binarize pixels in a centermost processing window that has not already been binarized. In the WT=100 example, there are four processing windows which are equally close to the center of the imaging target area 44: W(5,5), W(5,6), W(6,5) and W(6,6). To start the binarization process, one of the foregoing processing windows would be selected and its pixels binarized as described below. Then a second one of the foregoing processing windows would be selected and its pixels binarized and so forth.

At step 506, if after binarizing the pixels in a processing window W, the imaged signature area 45b is bounded or zoned as explained below, then the binarization process is stopped as shown at step 508. If after binarizing the pixels in a processing window W(p,q), the imaged signature area 45b is not bounded or zoned, then the binarization process returns to substep 516 of step 504 and the next centermost unbinarized processing window is selected and its image pixels binarized.

The binarization process proceeds as follows. At step 510, the binarization and zoning circuitry 288 calculates a contrast value C for each of the processing windows W(p,q); p=1, 10; q=1, 10. For a given processing window, W(p,q), the contrast value for that window, C(W(p,q)) is the difference of the maximum gray scale value and the minimum gray scale value for the image pixels comprising that window:

$$C(W(p,q))=\text{Max gsv}(W(p,q))-\text{Min gsv}(W(p,q))$$

where: Max gsv (W(p,q)) is the maximum gray scale value among the image pixels comprising the processing window W(p,q); and Min gsv (W(p,q)) is the maximum gray scale value among the image pixels comprising the processing window W(p,q).

Recall that a gray scale value of 0 represents a black image portion and a gray scale value of 255 represents a white image portion.

Next, at step 512, the binarization and zoning circuitry 288 calculates a value for a parameter denoted the global constant (GC) of all the processing windows. The global constant, GC, takes on one of two values depending on the mean gray scale value (MV) of the captured image frame. If the mean value, MV, is less than or equal to 127, then the global constant is set to 0. If the mean value, MV, is greater than 127, then the global constant is set to 10:

GC=0 if MV≦127

GC=10 if MV>127

The mean value is approximated by the binarization and zoning circuitry as follows:

MV=1/WT×Σ(Max gsv(W(p,q))+Min gsv(W(p,q)))/2

That is, the mean value, MV, is approximately equal to the summation of the maximum gray scale value in each of processing window (Max gsv (W(p,q))) plus the minimum gray scale value in each processing window (Min gsv (W(p,q))) divided by 2 and further divided by the total number of processing windows, WT=100 windows.

Figure 40A:
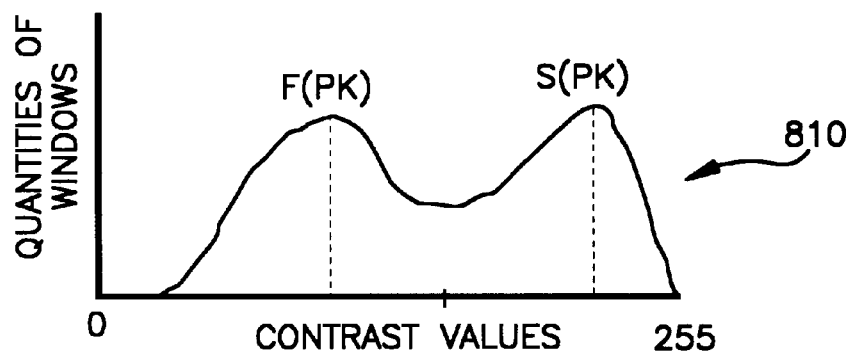
FIG. 40A is representative histogram of numbers of windows in a captured image frame as a function of contrast values for a case where the contrast value data exhibits unimodal distribution.
Figure 40B:
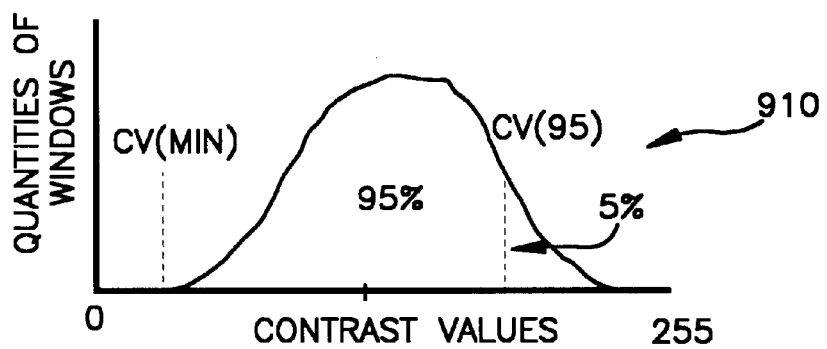
FIG. 40B is representative histogram of numbers of windows in a captured image frame as a function of contrast values for a case where the contrast value data exhibits unimodal distribution.

Next, the binarization and zoning circuitry 288, at step 514, calculates a global threshold value (GTV) by determining certain parameter based on an analysis of a histogram of the 100 window contrast values, C(W(p,q)) for the captured image frame. Empirically, it has been found that one of two distributions for the contrast value histogram will result for a given captured image frame. One typical distribution is illustrated in FIG. 40A at 810. FIG. 40A illustrates a contrast histogram characterized by a bimodal distribution, that is, having two "peaks". The other typical distribution is illustrated in FIG. 40B at 910. FIG. 40B illustrates a contrast histogram characterized by a unimodal distribution, that is, having one "peak". The binarization and zoning circuitry 288 applies an appropriate goodness of fit test, well know in the art, to determine if a unimodal or bimodal histogram resulted from the plot of contrast values, C(W(p,q)).

If it is determined that the contrast histogram is bimodal, the binarization and zoning circuitry 288 calculates contrast values (F(PK) and S(PK)) corresponding to the highest histogram values in each "peak" of the bimodal distribution. Then, the global threshold value, GTV, is computed as follows:

GTV=((F(PK)+S(PK))×(50−GC))/100

If it is determined that the contrast histogram is unimodal, the binarization circuitry calculates contrast values (CV(MIN) and CV(95)) corresponding to the minimum contrast value histogram value, CV(MIN), and the contrast value, CV(95), at which 95% of the contrast values have a magnitude less than or equal to the contrast value CV(95). Then, the global threshold value, GTV, is computed as follows:

GTV=((CV(MIN)+CV(95))×(50−GC))/100

It should be noted that the histograms shown in FIGS. 40A and 40B are continuous distributions. It is assumed that appropriate class intervals have been selected and proper techniques known to those skilled in the art in converting the discrete distribution of contrast values, C(W(p,q)) into corresponding continuous distributions shown in FIGS. 40A and 40B.

The steps 510, 512 and 514 involve all the processing windows W(p,q) and, therefore, are calculated only once for a captured image frame. The remaining steps 516, 518, 520 are applied repetitively to each processing window individually.

At step 516, the binarization and zoning circuitry 288 calculates a threshold value, TV(W(p,q)), for a given processing window, W(p,q), as follows: If the contrast value, C(W(p,q)), for the window is greater than or equal to the global threshold value, GTV, that is, C(W(p,q))≧GTV, then TV(W(p,q))=(Max gsv(W(p,q))+Min gsv(W(p,q)))/2

If the contrast value, C(W(p,q)), for the window is less than the global threshold value, GTV, that is, C(W(p,q))<GTV, then TV(W(p,q))=0

At step 518, for the given for each processing window, W(p,q), the binarization circuitry applies the calculated threshold value, TV(W(p,q)), for that window to the image pixels comprising that window. If the gray scale value (gsv(i,j)) of an image pixel, P(i,j) in a processing window is greater than or equal to the window threshold value, TV(W(p,q)), then the pixel is assigned a binarized value (bv(i,j)) of zero (0=white pixel). If the gray scale value (gsv(i,j)) of an image pixel, P(i,j), in a processing window is greater than or equal to the window threshold value, TB(W(p,q)), then the pixel is assigned a binarized value (bv(i,j)) of one (1=black pixel). Mathematically:

If gsv(i,j)>TV(W(p,q)), then bv(i,j)=0

If gsv(i,j)<TV(W(p,q)), then bv(i,j)=1

It will be found that some processing windows contain several black pixels (bv=1) and several white pixels (bv=0). Such windows are referred to as "contrast windows". However, windows which include only background portions of the target object will usually include only pixels which are white (bv=0). These windows are referred to as "white windows".

In FIG. 34, a portion of the document 46b is shown. The document 46b includes the signature area 45b. FIG. 35 schematically illustrates the approximate imaging target area 44 overlying the target signature area 45b of the document 46b. The word "approximate" is used because as noted above certain perimeter image pixel rows and columns are discarded to achieve the WT=100 configuration shown in the Figure. In FIG. 37, the capture image frame within the imaging target area 44 is shown. The processing windows which will result in "white windows" (only pixels with bv=0) are designated with the value "0", while the remaining processing windows are "contrast windows" having pixels with bv=1 and bv=0.

As noted above, the binarization and zoning circuitry 288 works from the center of the imaging area 44 outwardly. It is assumed that the operator 105 correctly aims the device 10 at the target signature area 45b and, thus, there will be contrast windows at the center of the image. Moving outwardly from the center, the binarization and zoning circuitry 288 continue to process windows until a border or perimeter of white windows completely surrounding the contrast windows is found. Since it is assumed that the imaging assembly 18 is properly aimed at the target signature area 45b, once a white window border around the center contrast windows is completed, further window processing is halted since it must be the case that the white window border encapsulates the target signature area 45b and any contrast windows outwardly of the white window border would not be part of the signature area 45b. Thus, the remainder of the image frame is ignored.

Therefore, at step 506, the binarization and zoning circuitry 288 determines if the signature area 45b is zoned or surrounded by white windows, if so at step 508 window processing is halted. If at step 506, the binarization and zoning circuitry 288 is not zoned, the process returns to step 516 as shown in FIG. 41.

The radially outwardly method of window processing results in improved dataform reading time because of less processing of nondata form portions of the captured image frame. Also, the binarization process results in less memory space requirements. Additionally, the imaging mode will also be more efficient because only the area corresponding the signature area needs to be saved, compressed and downloaded or transmitted via the radio module 314.

Rotation Correction

As can be seen in FIGS. 35–37, the signature area 45b is not aligned with the imaging target area 44. That is, if the signature area 45b were confined within an imaginary rectangular box SB (FIG. 38), the sides B1, B2, B3, B4 of the box SB would not be parallel with respective "sides" corresponding to the outer perimeter of the imaging target area 44. This is inefficient for storage of data representing the signature area and for processing. The rotation correction circuitry 289 is provided to correct such misalignment of a target object such as the dataform 45a or signature area 45b and the imaging area 44.

Figure 37A:
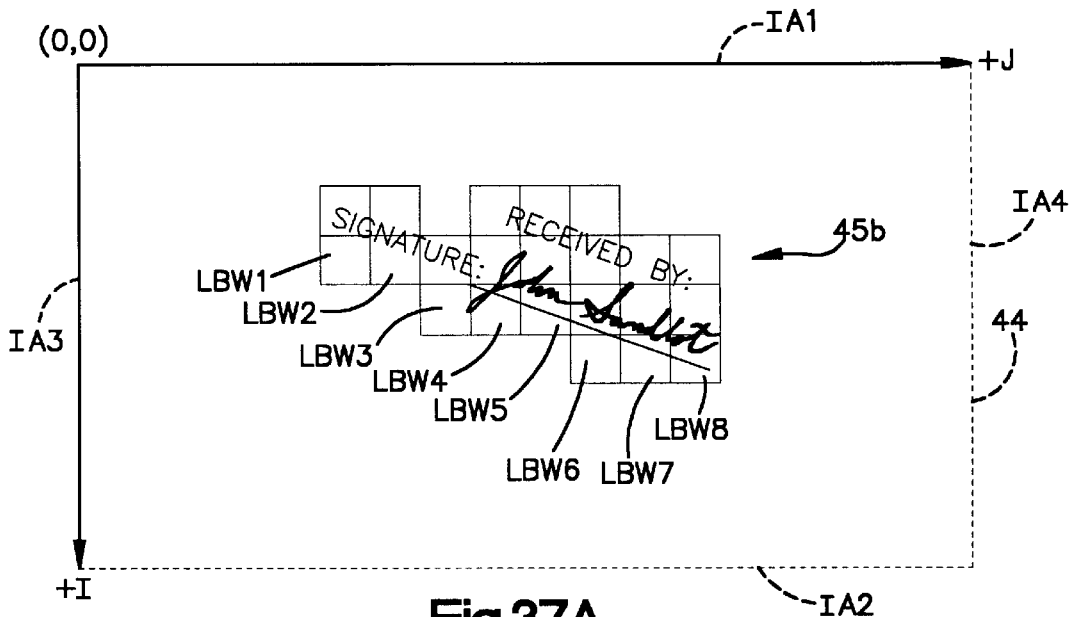
FIG. 37A is an enlarged representation of the signature area of the document of FIG. 34 illustrating angular rotation of the signature area.
Figure 38:
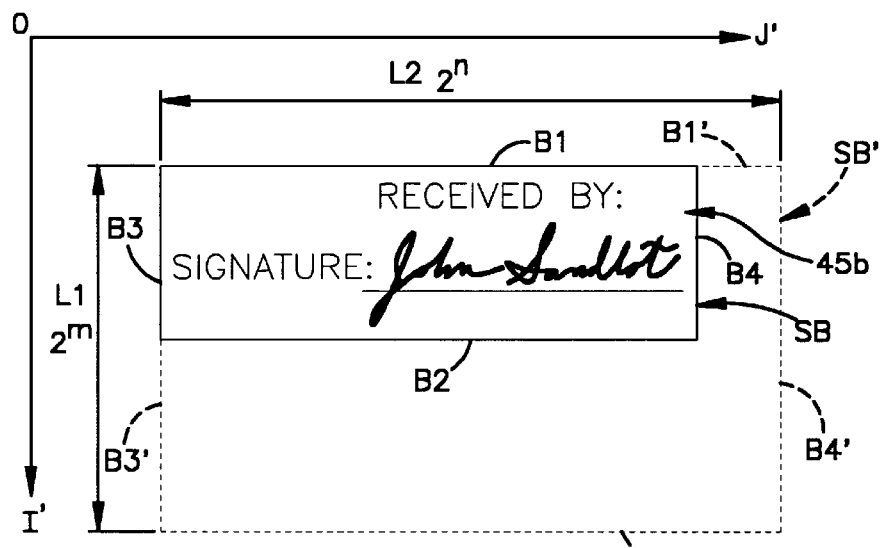
FIG. 38 is a representation of the signature area of the document of FIG. 34 after correction for angular rotation.

The rotation correction circuitry 289 rotates the signature area 45b so that the sides B1, B2, B3, B4 (FIG. 38) of the signature box SB enclosing the signature area are approximately parallel to respective sides IA1, IA2, IA3, IA4 (FIG. 37A) of the imaging target area 44. Assuming the signature area 45b is approximately rectangular, and that the sides of the signature box SB are approximately parallel to the target area 44, the area of box SB needed to bound the signature area 45b is smallest when the signature area is oriented rectangularly as shown in FIG. 38 as opposed to being in an angled orientation.

Figure 37B:
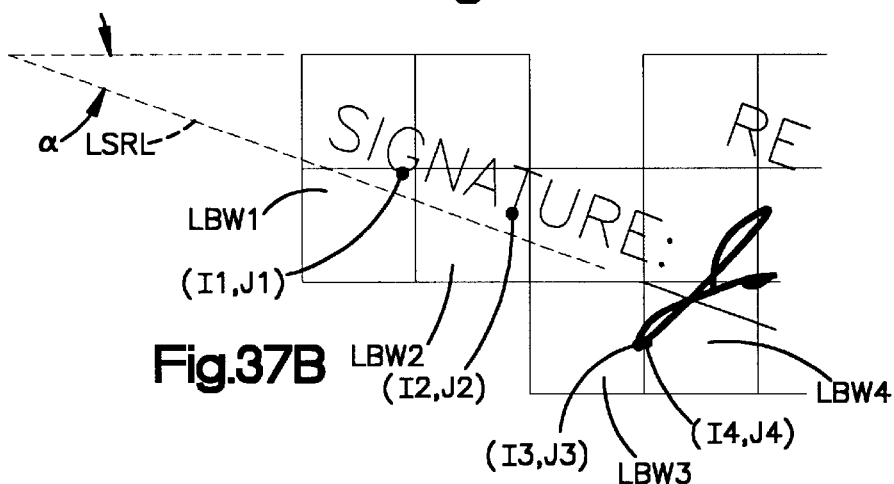
FIG. 37B is an enlarged representation of a portion of the signature area of the document of FIG. 34 illustrating angular rotation of the signature area.
Figure 42:
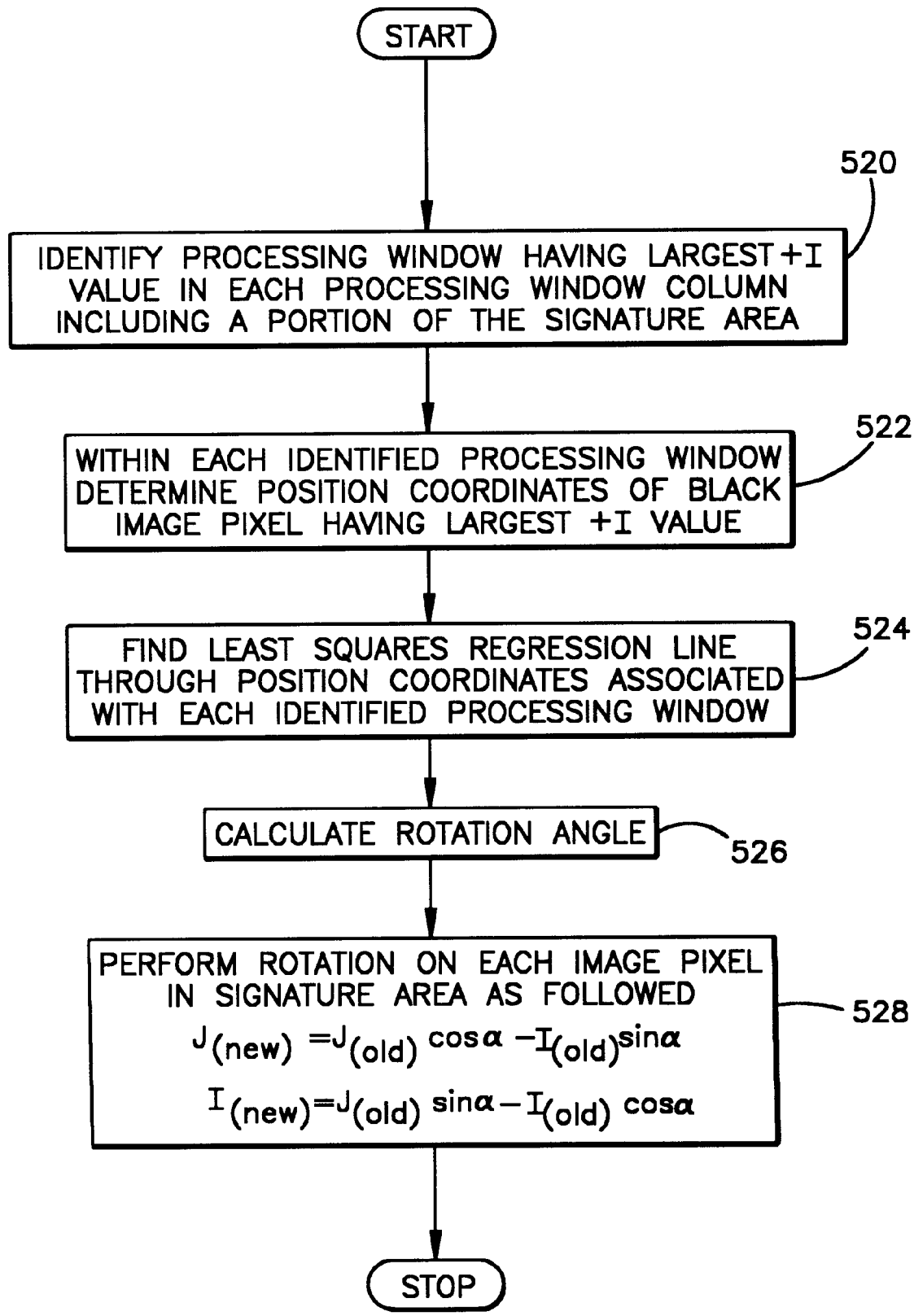
FIG. 42 is a flow chart of the rotation correction process.

The rotation is performed by first calculating the angle, $\alpha$, by which the signature area 45b must be rotated and, second, mathematically rotating the binary image data corresponding to the signature area such that the signature area is horizontal. A simplified flow chart for the rotation correction process is shown in FIG. 42. A least squares regression line is calculated for a set of coordinates which represent locations of the lowest black pixel in each column of the processing windows comprising the signature area 45b. In FIG. 37A, the 22 contrast windows for the signature area 45b are shown. In each of the eight processing window columns, the lowest processing window has been identified, that is, the windows having the greatest values with respect to the +I axis, where the origin is shown in the upper left hand corner of the imaging target area 44. This is shown at step 520 in FIG. 42. The lowest processing window in each window column are identified in FIG. 37A as LBW1, LBW2, LBW3, LBW4, LBW5, LBW6, LBW7, LBW8. Next, at step 522, within each processing window, LBW1, LBW2, LBW3, LBW4, LBW5, LBW6, LBW7, LBW8, the position coordinates of the lowest positioned image pixel (that is, the image pixel with the largest +I value) having a binarized value of 1 (black pixel) is determined and its coordinates with respect to the +I and +J axis identified. In FIG. 37B, only a the first four columns of the signature area 45b are shown. The coordinates of the four processing windows are as follows:

| Lowest processing window | Lowest position image pixel coordinate |
| --- | --- |
| LBW1 | I1, J1 |
| LBW2 | I2, J2 |
| LBW3 | I3, J3 |
| LBW4 | I4, J4 |

There would be a total of eight lowest position image pixel coordinate pairs (I1, J1) ... (I8, J8). As known to those skilled in the art, a least squares regression line (labeled LSRL in FIG. 37B) would be calculated, as shown at step 524, to find the best straight line through the pixel coordinate pairs. As shown in step 526, the rotation angle, $\alpha$, (FIG. 37B) would then be calculated geometrically as the angle the regression line LSRL makes with the axis +J.

Finally, at step 528, the rotation correction circuitry 289 operates to perform the rotation by converting the coordinate values $(I_{(old)}, J_{(old)})$ of each signature area pixel to new coordinate values $(I_{(new)}, J_{(new)})$ (as determined along the +I, +J axis) with the following formulas:

$$J_{(new)} = J_{(old)} \cos \alpha - I_{(old)} \sin \alpha$$

$$I_{(new)} = J_{(old)} \sin \alpha + I_{(old)} \cos \alpha$$

Compression of Binarized Data

The binarized values corresponding to the captured and rotation corrected image area are next operated on by the image compression circuitry 294 which compresses the binarized values prior to the data being coupled to the serial output circuitry 296. The compressed digital data (represented schematically by the arrow labeled 300 in FIG. 29A) is further processed by the serial output circuitry 296 and made available as compressed digital data 310 through the serial output port 312 and/or the radio module 314.

The image compression circuitry 294 utilizes an image compression algorithm to reduce the size of the set of digital image data representing the target signature area 45b. FIG. 38 represents the binary data in the selected windows after angular correction. As noted above, the previously calculated imaginary rectangular box SB (FIG. 38) is of a minimum size to enclose all of the black pixels of the signature area 45b. The box SB is then increased in size by the image compression circuitry 294 such that the quantity of pixels in both the vertical direction and horizontal directions is an even power of two. The increased size imaginary box is schematically represented as SB' in FIG. 38 and has its sides labeled B1'. B2', B3', B4'. The box SB' has a length along the I' axis of L1 and a length along the J' axis of L2.

Figure 39:
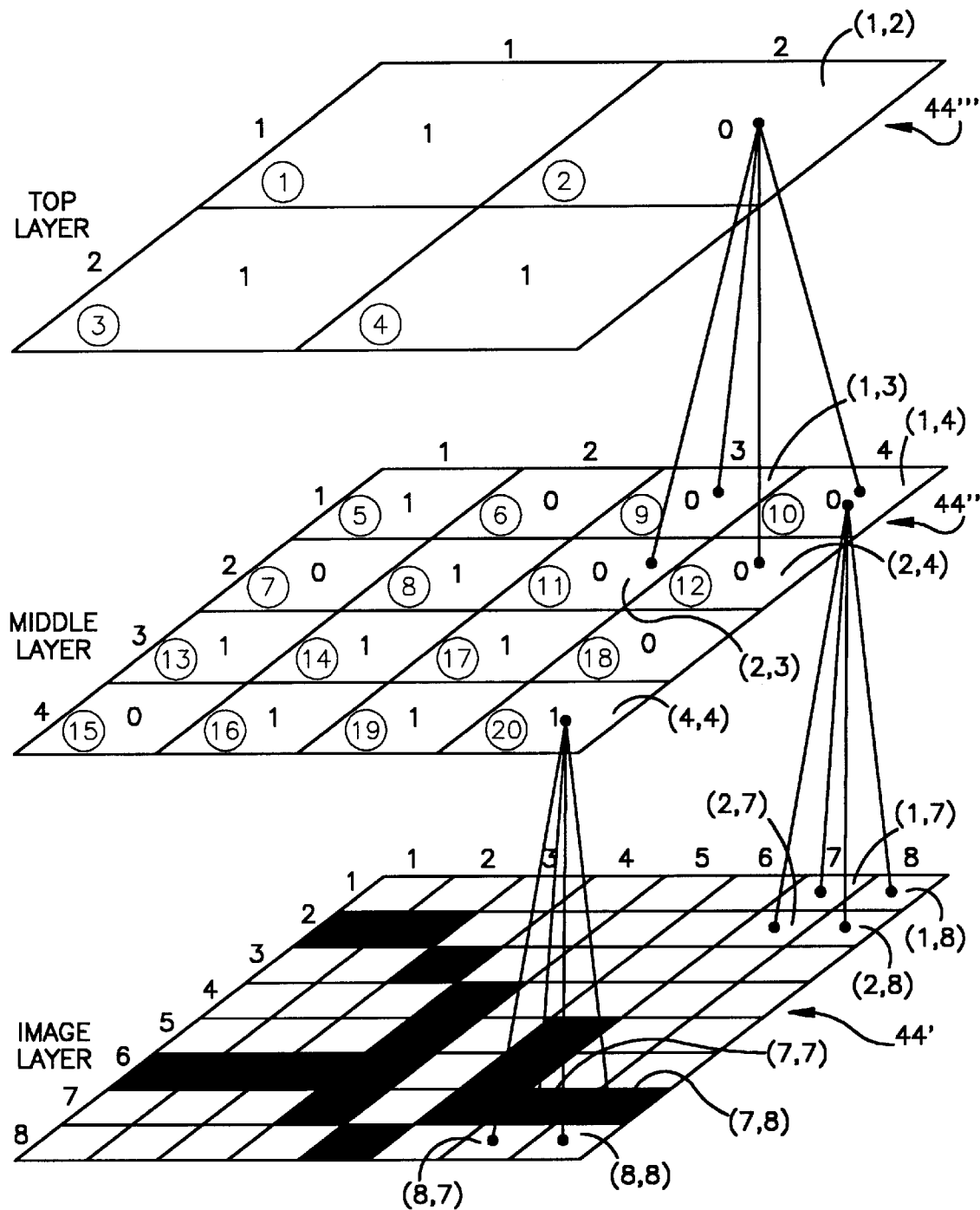
FIG. 39 is a representation of a compression algorithm for compressing binarized data.

Recognizing that the signature capture application will always involve a black signature on a white background, the pyramid compression procedure illustrated in FIG. 39 is used. A multi layer pyramid of 2D data sets is developed wherein each layer has one quarter the quantity of data as the previous layer. In the FIG. 39 schematic representation, a portion 44' of the imaging target area 44 is shown. The imaging area portion 44' or lowest layer is comprised of an 8×8 pixel area or layer having 64 binarized pixels. The next or middle layer labeled 44'' is compressed by a factor of four and is comprised of 16 data squares. The top layer is labeled 44''' is also compressed by a factor of four and is comprised of 4 data squares.

In the top and middle layers 44''', 44'', the value of a particular data square will be "one" if any of the four "child" squares in the layer below, which corresponding to that square, have a value of "one". The value of a particular data square will be zero if all of the four "child" squares in the layer below, which correspond to that square are "zero". For example, in the image or bottom layer 44', pixels labeled (1,7), (1,8), (2,7), (2,8) have a binary value of zero. Thus, in the middle layer 44", the data square labeled (1,4) has a value of zero. On the other hand, in the image or bottom layer 44', pixels labeled (7,7), (7,8) have a value one, (8,7), (8,8) have a binary value of one. Thus, in the middle layer 44", the data square labeled (1,4) has a value of one.

The value of each data square is saved in the order from left to right and top to bottom as numbered within the circles in FIG. 39. The compression algorithm takes advantage of the fact that if in the top layer 44''' any data square has a value of zero, then it is necessarily the case that its lower layer "children" and "grandchildren" data squares and image pixels must also have value zero. This is illustrated by the data square labeled (1,2) in the top layer 44''' which has a value of zero. Then, it must be the case that data squares labeled (1,3), (1,4), (2,3), (2,4) in the middle layer 44" have a value of zero and the image pixels (1,5), (1,6), (1,7), (1,8), (2,5), (2,6), (2,7), (2,8), (3,5), (3,6), (3,7), (3,8), (4,5), (4,6), (4,7), (4,8) in the image layer 44' have a value of zero. Therefore, such data is not stored for the middle and lower layers 44", 44' as it can be reconstructed by a remote device receiving the compressed signature area binarized data by operating the compression algorithm in reverse. Therefore the data stored in the memory 311 for output of the image portion 44' would be would be as follows:

| | |
|---|---|
| Upper layer | 1011 |
| Middle layer | 1001 1101 1011 |
| Image Layer | 0011 1001 0011 0111 0101 0100 0110 1100 |

Note that because there are three "one" values in the top layer, there are three sets of values in the second layer. Because there are eight "one" values in the second layer, there are eight sets of values in the third layer. In this particular example, 64 bits of data has been compressed to 48 bits of data without any loss. The original image portion 44' can be fully recovered. The compression ratio is even higher when a greater portion of the image area is white.

MODE II
Normal Imaging Operating Mode

The portable data collection device 10 operates in normal imaging operating mode when the set switch 28a is moved to its second position (not shown). When an operator institutes a normal imaging operating imaging session by depressing the imaging trigger 28, the image capture trigger circuit 28a sends a signal to the control and selection circuitry 284 causing the selection circuitry to couple a captured frame from the frame buffer memory 274 to the image compression circuitry 294 to be compressed before being output to the serial output circuitry 296 and the memory 311 therein.

The image compression circuitry 294 uses a different compression algorithm for compressing image gray scale values when the imaging assembly 18 is operating in the normal imaging mode than to compress binarized values as described above when the imaging assembly is operating in the signature area capture mode. Preferably, the algorithm used by the compression circuitry 394 in the normal imaging mode to compress the gray scale image values has a higher degree of compression than the pyramid compression algorithm present in connection with FIG. 39. The desirability of greater data compression results the fact that in the normal imaging mode pixel image data is contained in an eight bit gray scale value whereas in the signature area capture and dataform reading modes, the a pixel's image data is contained in a single bit. Thus, in the imaging mode, the number of bits to be stored per pixel is eight times greater than in the signature area capture and dataform reading modes. Further, some image data loss can be tolerated in the normal imaging mode whereas in the signature area capture and dataform reading modes image data loss is not as tolerable. That is, an image of an item such as a product or product packaging in the target area 44 will still be recognizable and useful to supervisory personnel viewing the image reconstructed from the captured image frame data even if there is some slight distortion of the image. Since the higher the degree of compression, the more likelihood of image data loss, the degree of compression in the normal imaging mode is preferably higher than in the signature area capture and dataform reading modes.

One preferred algorithm which may be used by the image compression circuitry 294 when the imaging assembly 18 is operating in the normal imaging mode is the 2D wavelet transform compression algorithm as described in "A 64 Kb/s Video Code Using the 2D Wavelet Transform" by A. S. Lewis and G. Knowles, published in IEEE Computer Society Press, Order No. 2202. The HARC Wavelet Transform System utilizing such technology is available from Houston Advance Research Center in Houston, Tex. and is capable of compressing photographic data with an image compression ratio of up to 400:1.

MODE III
Dataform Reading Mode

When an operator institutes a dataform reading session (dataform reading mode) by depressing the dataform reading trigger 26, the dataform read trigger circuit 26a sends a signal to the control and selection circuitry 284 causing the control and selection circuitry to couple a captured frame from the frame buffer memory 274 to the image processing circuitry 290.

The image processing circuitry 290 utilizes the binarization and zoning circuitry 288 as described above to identify and binarize the gray scale values of a captured image frame stored in the frame buffer memory 274 corresponding to the portion of the imaging target area 44 having the imaged dataform as described above with respect to the signature area capture mode. The binarized image values are then operated on by the cell extraction circuitry 291 which functions to recreate the image of the imaged dataform in the frame buffer memory 274. Since the image data is already binarized, cell extraction may be accomplished using known techniques for each dataform format. Known techniques include, but are not limited to, run line sampling, pattern matching and Fourier transformation techniques. Run line sampling may be particulary advantageous.

The image processing circuitry 290 includes the decoding circuitry 292 for decoding 1D and 2D dataforms imaged in the target area 44. The decoding circuitry 292 operates on the cell extracted binarized image data to decode the data encoded in the imaged dataform. A number of methods of dataform decoding of cell extracted data are known to those skilled in the art. Decoding of the cell data is accomplished by known decoding methods for each particular dataform format.

The control and selection circuitry 284 routes data 298 representing a decoded dataform data directly from the decoding circuitry 292 to the serial output circuitry 296. The decoded dataform data 298 is not compressed prior to output to the serial output circuitry 296. There is a possibility of error in the compression and subsequent decompression process and losing even a portion of a decoded dataform data may result in adverse consequences such as subsequent errors in updating inventory, determining the status or tracking an item, etc. Thus, the decoded dataform data 298 is not compressed.

Voice Capture Module 304

Because the portable data collection device 10 is adapted for use in remote on-site locations for reading a dataform identifying a particular item or capturing an image of an item, it is desirable to enable the imaging assembly 18 to also capture a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signal. Data 308 representing the compressed digitized voice signal is coupled to the serial output circuitry 296.

For a predetermined period of time after either the dataform reading trigger 36 is depressed to initiate a dataform reading session (dataform reading mode) or the imaging trigger 28 is depressed to initiate a image capture session (imaging mode), the control and selection circuitry 284 monitors the image capture trigger switch 28. If the operator depresses the trigger 28 during the predetermined period, the voice capture module 304 and voice compression circuitry 306 are activated for verbal input. As long as the operator keeps the trigger depressed, the voice capture module 304 and voice compression circuitry 306 will remain activated so that the operator can speak into the microphone 34 and provide information concerning an item whose image was captured or whose dataform was read which will be transmitted and/or stored with the corresponding image or decoded dataform. Normally, the voice capture module 304 will be used subsequent to an imaging session where the operator wants to communicate to supervisory personnel reviewing the captured image some additional information concerning the imaged item such as the item's location, a short description of the problem with the item, etc. The voice compression circuitry 306 utilizes one of a number voice compression algorithms well known to those skilled in the art.

Decoded dataform data 298, compressed image data 300 and compressed digitized voice data 308 are routed to the serial output circuitry 296 which assembles output data 310 and stores the output data in a memory 311. The output data may be stored for downloading at the end of a work session through the serial output port 312. Alternately, the output data 310 may be routed to an input port of the radio module 314 mounted on the control and decoder board 22 (shown schematically in FIG. 14). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc.

Operation of Imaging Assembly 18 in Dataform Reading and Imaging Modes

First operating embodiment—single frame imaging in normal imaging mode

Figure 31A:
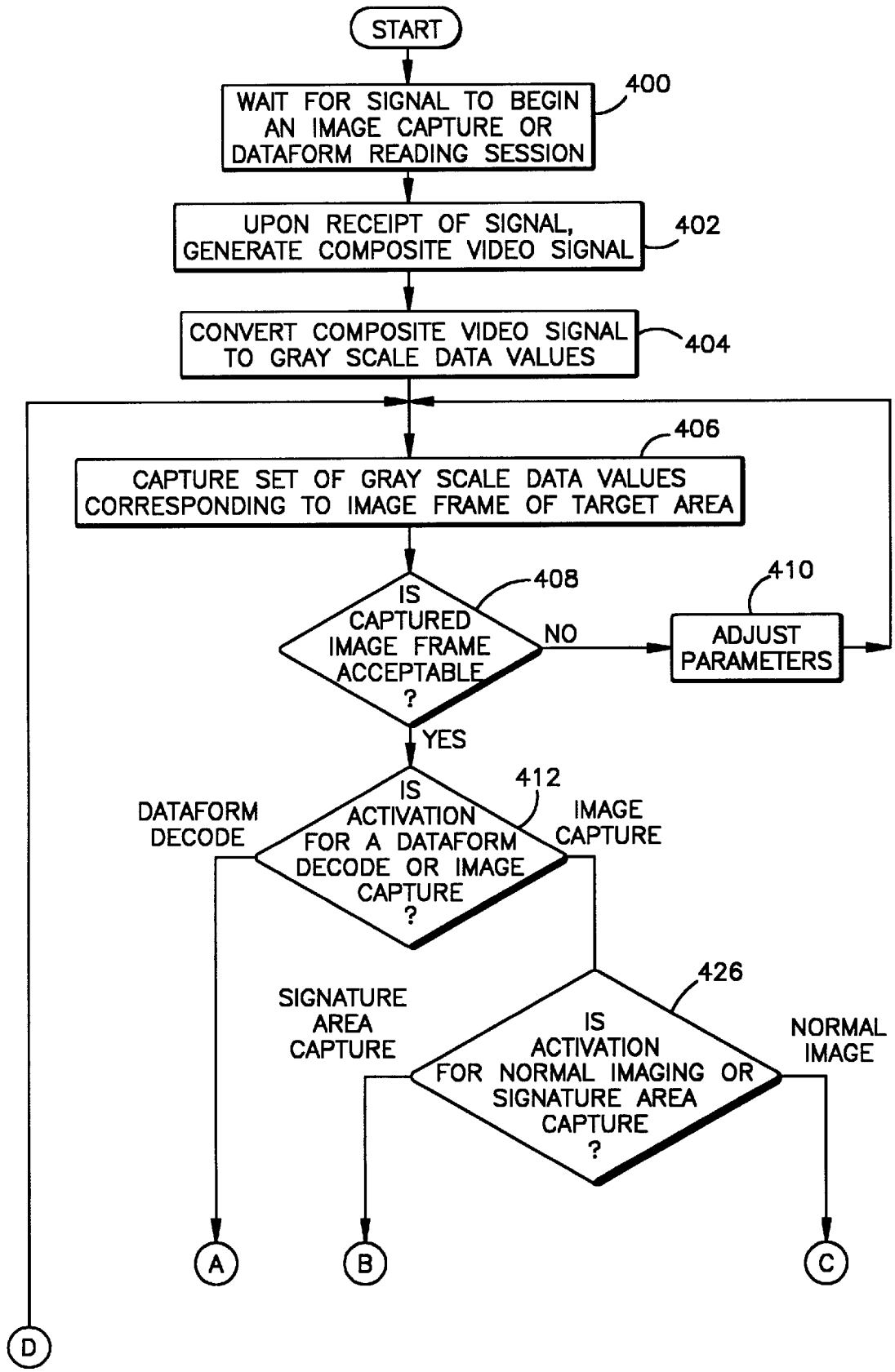
FIG. 31A is a portion of a flow chart setting forth the operating modes and a first operating embodiment of the normal imaging mode of the portable data collection device of the present invention.
Figure 31B:
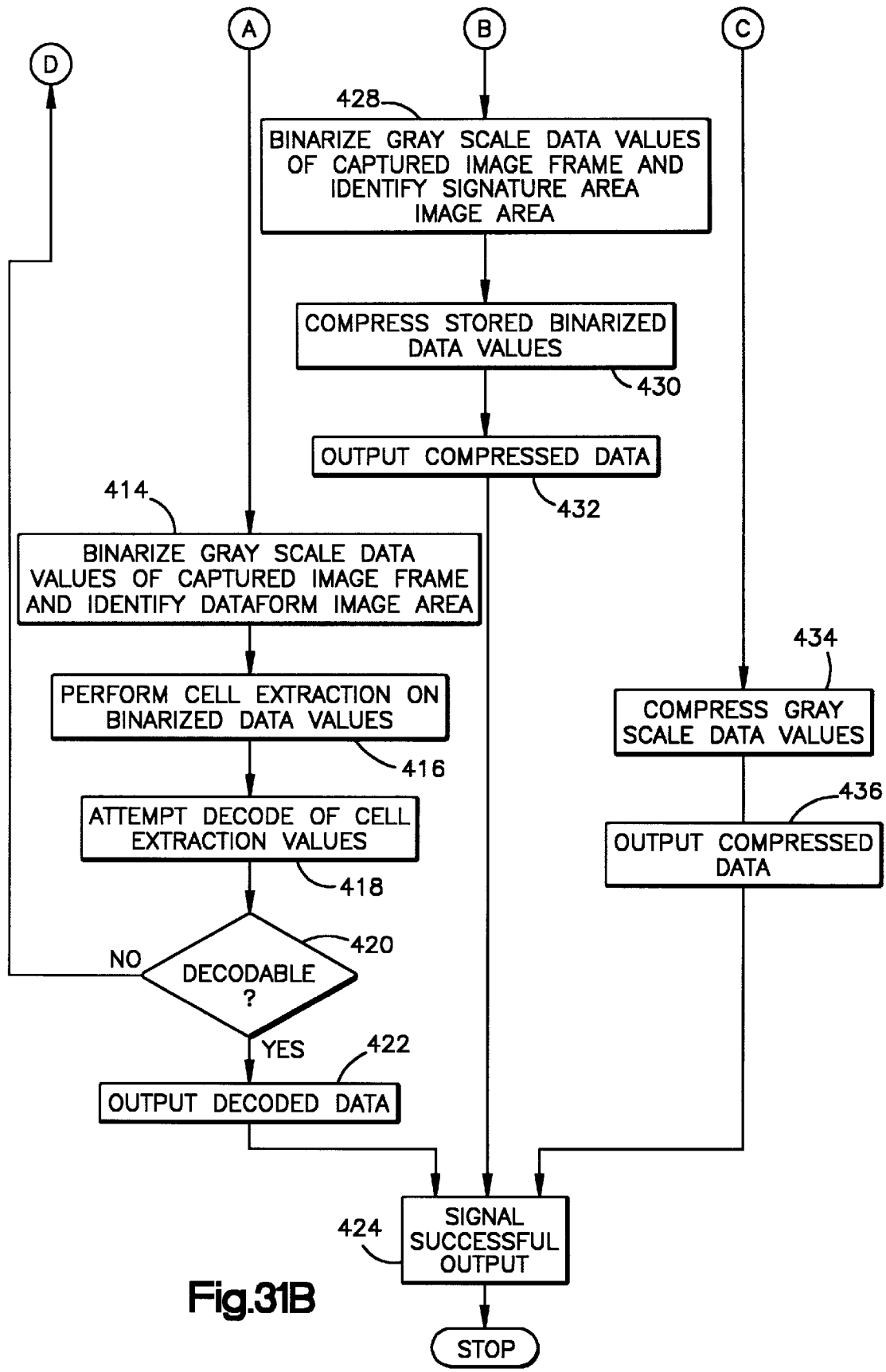
FIG. 31B is the corresponding portion of the flow chart of FIG. 31A.
Figure 32A:
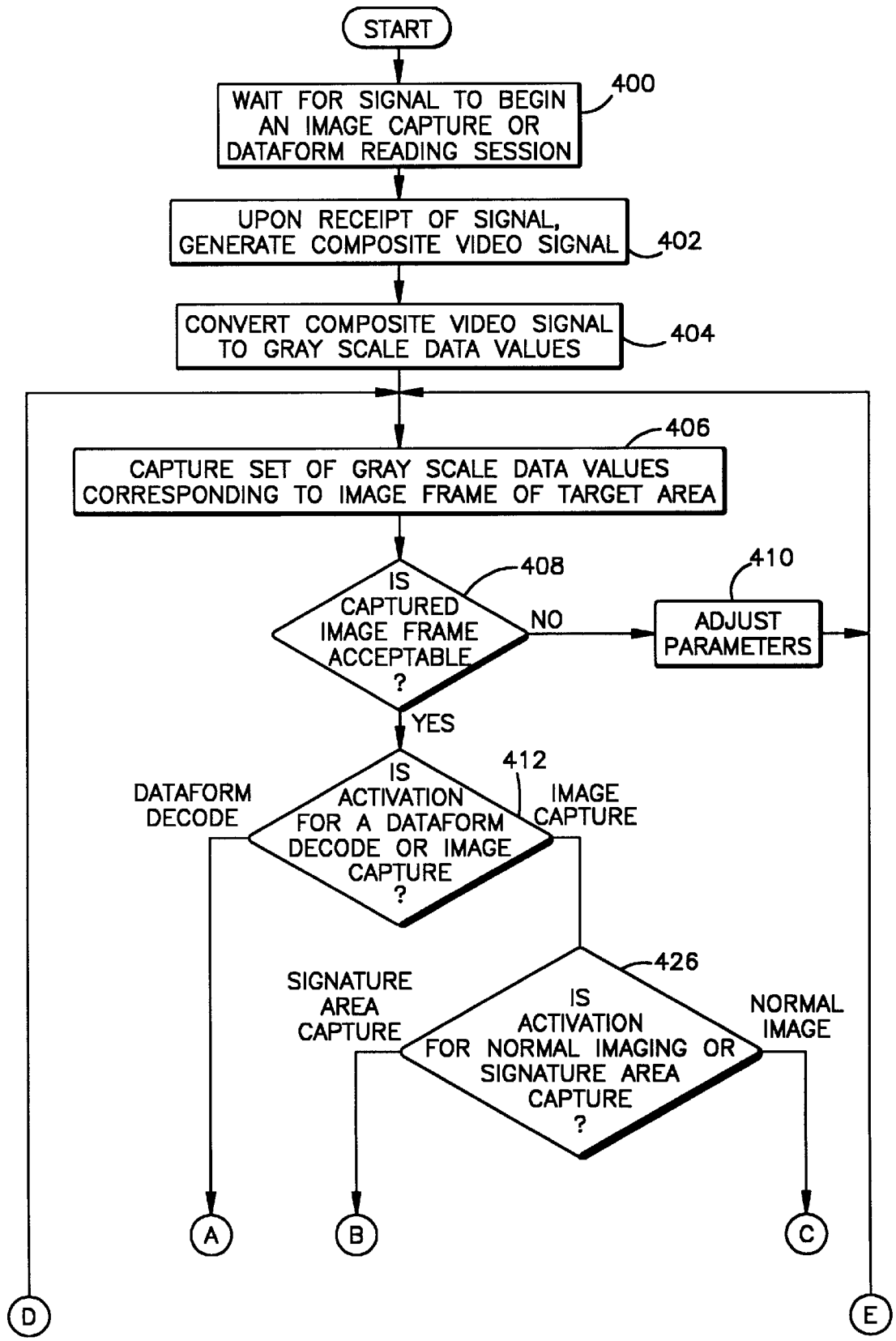
FIG. 32A–B are portions of a flow chart setting forth the operating modes and a second operating embodiment of the normal imaging mode of portable data collection device of the present invention.
Figure 32B:
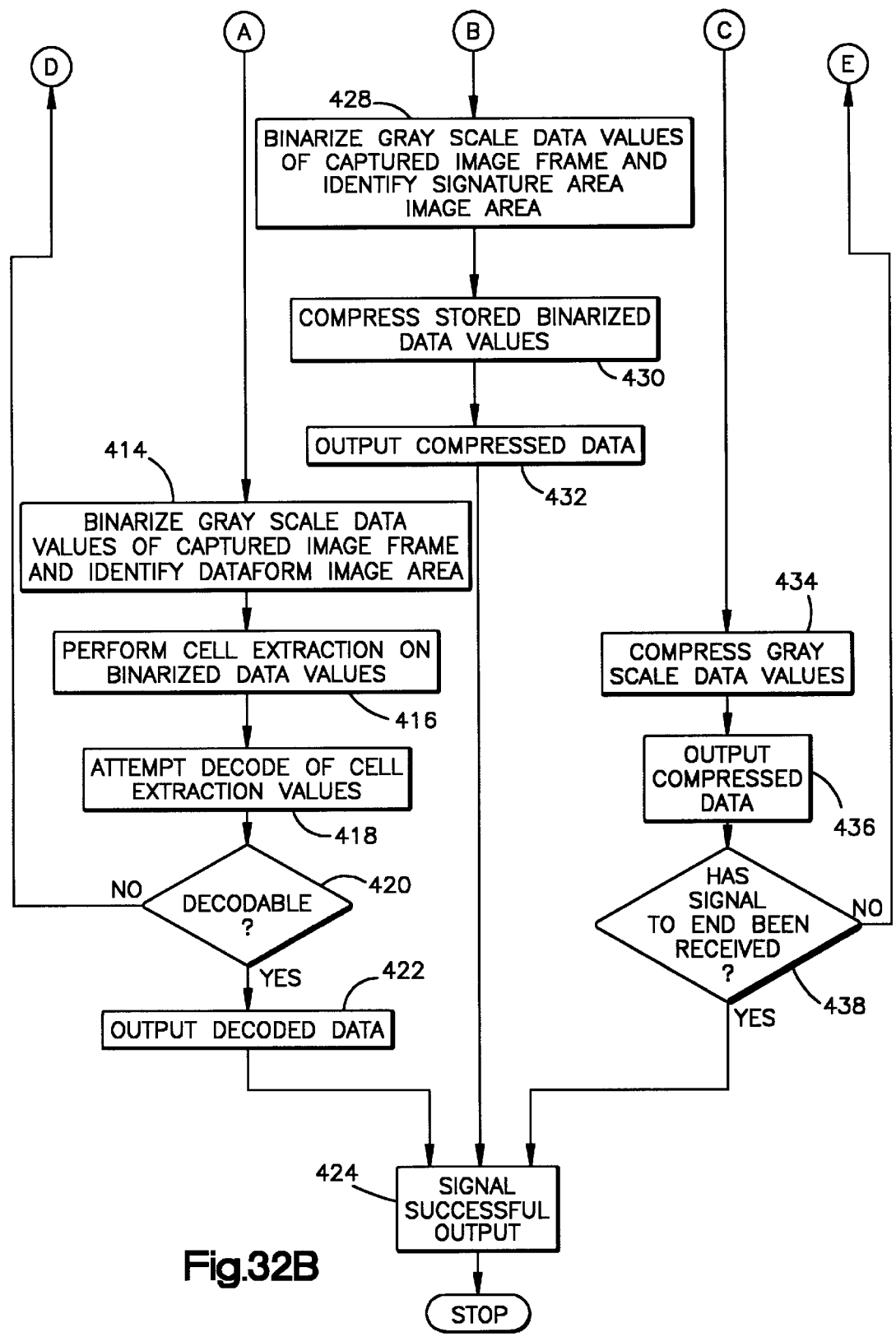

The flow chart shown in FIGS. 31A and 31B illustrates the operation of the imaging assembly 18 in the dataform decoding mode, the signature capture imaging mode and a first operating embodiment of the normal imaging mode. In the first operating embodiment of the normal imaging mode, a single frame of the image in the target area 44 is captured, compressed and output when the operator depresses the imaging trigger 28. The flow chart shown in FIGS. 32A and 32B illustrates the operation of the imaging assembly 18 in the dataform decoding mode and a second operating embodiment of the normal imaging mode. In the second operating embodiment of the normal imaging mode, successive frames of the image in the target area 44 are captured, compressed and output as long as the operator has the imaging trigger 28 depressed.

The normal imaging mode is advantageously employed when the operator using the portable data collection device 10 notices the item 46a is damaged, out of place, incomplete, etc. The imaging mode of the imaging assembly 18 is used to capture an image of the item 46a and, using the radio module 314, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc. Of course the captured image of the item 46 may be stored in the memory 311 for later downloading via the serial output port 312.

Turning to the first operating embodiment of the imaging mode shown in FIGS. 31A and 31B, at step 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. At step 402, upon receiving an appropriate signal, the imaging assembly 18 is activated generating the composite video signal 262. At 404, the signal processing circuitry 264 receives the video signal 262 and converts the analog video signal 262 to a series of 8 bit gray scale values.

At step 406, a set of gray scale values corresponding to one image frame of the target area 44 are captured, that is, stored in the frame buffer memory 274 and subjected to further processing by the image processing circuitry 290 and the exposure parameters control circuitry 316. At step 408, the exposure parameters control circuitry 316 including the fuzzy logic circuitry 324 determines if the captured image frame is acceptable, that is, determining if the image is within predetermined acceptable ranges for brightness and the magnitude of charges read out from the photosensors of the 2D photosensor array 48. If the fuzzy logic circuitry 324 determines the captured frame is not acceptable, one or more of the operating parameters of the board camera assembly 38 and the A/D converter circuitry 272 are modified as shown at step 410. The loop represented by steps 406, 408, 410 are repeated until the captured frame is determined to be acceptable.

At step 412, if the control and selection circuitry 284 determines that the activation signal is from the dataform reading trigger 26 requiring a dataform decode, dataform reading mode, at step 414 the gray scale values representing the imaged dataform in the target area 44 are binarized as described above and the dataform image zone or region within the target area 44 is identified. At step 416, cell extraction is performed by the cell extraction circuitry 291 on the binarized data representing the imaged dataform to replicate the light and dark pattern exhibited by the target dataform 45a. Next, at step 418, the decoding circuitry 292 operates on the cell extraction data in an attempt to decode the imaged dataform.

At step 420, a determination is made if the decoding was successful. At step 422, if the decoding was successful, the extracted decoded data is output to the serial output circuitry 296. The decoded data is stored in memory 311 for subsequent downloading via the serial output port 312 and/or forwarded to the radio module 314 for rf transmission to a remote device. At step 424, the orange color of the LED indicator 32 is energized for a predetermined time to signal the operator 105 that the target dataform 45a in the target area 44 has been successfully read. Subsequently, the imaging assembly 18 is turned off. If at step 420, the decoding was not successful, the process returns to step 406 where another image frame is captured and the remaining steps are repeated.

If at step 412, the control and selection circuitry 284 determines that the activation signal is from the imaging trigger 28, then at step 426 the position of the two position set switch 28a determines whether the imaging assembly 18 operates in the signature capture imaging mode or the normal imaging mode. If the set switch 28a is in its upper position, the imaging assembly 18 operates in the signature capture imaging mode. At step 417, the gray scale values representing the imaged signature area in the target area 44 are binarized as described above and the signature area zone or region within the target area 44 is identified. At step 430, the image compression circuitry 294 operates on the binary signature area data in accord with the compression algorithm described above in connection with the signature capture imaging mode. At step 432, the compressed binary data is output to the serial output circuitry 296. The compressed binary data is stored in memory 311 for subsequent downloading via the serial output port 312 and/or forwarded to the radio module 314 for rf transmission to a remote device. At step 424, the orange color of the LED indicator 32 is energized for a predetermined time to signal the operator 105 that the signature area 45b in the target area 44 has been successfully imaged.

If the set switch 28a is in its lower position, the imaging assembly 18 operates in the normal imaging mode. At step 434, the image compression circuitry 294 operates on the gray scale image data in accord with the compression algorithm described above in connection with the normal imaging mode. At step 435, the compressed gray scale data is output to the serial output circuitry 296. The compressed gray scale data is stored in memory 311 for subsequent downloading via the serial output port 312 and/or forwarded to the radio module 314 for rf transmission to a remote device. At step 424, the orange color of the LED indicator 32 is energized for a predetermined time to signal the operator 105 that the portion of the target item 46a (or target document 46b) in the target area 44 has been successfully imaged.

Advantageously, the control and selection circuitry 284 may be programmed or otherwise controlled to switch modes between consecutive actuations. For example, if the portable data collection device 10 is being used in the package delivery industry, it will typically be the case that a dataform read of a package's dataform will be followed by the capture of the recipient's signature. In such a case the control and selection circuitry 284 may be programmed to switch between the dataform reading mode and the signature capture mode upon each actuation of the dataform reading trigger 26. In this manner a first actuation of the dataform reading trigger 26 will result in a dataform reading session to read a package's dataform, the next actuation of the trigger 26 will result in a signature capture session for capturing a signature area which includes the package recipient's signature. Only when normal imaging is required will the imaging trigger 28 need to be depressed. Other advantageous arrangements and actuation of modes will be apparent to those skilled in the art.

Operation of Imaging Assembly 18 in Dataform Reading and Imaging Modes

Second operating embodiment—continuous frame imaging in normal imaging mode

Referring to FIGS. 32A and 32B, in a second operating embodiment of the normal imaging mode, successive image frames of the target item 46a or target document 46b in the target area 44 are captured for as long as the operator maintains the imaging trigger 28 depressed. This operating embodiment would be advantageous in situations where the item 46a which the operator wishes to image because of some defect, damage, etc., is very large compared to the area of the target area 44 or where the target document 46b is very large compared to the area of the target area 44. Therefore, capturing a single image frame and transmitting a signal corresponding to the captured frame to a remote device or supervisory review may not provide supervisory personnel with an image covering a large enough portion of the item 46a or document 46b to ascertain the problem and determine appropriate corrective action. By capturing successive frames during the period that the operator keeps the imaging trigger 28 depressed, the operator may move the portable data collection device 10 with respect to the item 46a or document 46b to provide a video image of the complete item or document (or an image of as much of the item as necessary to provide for identification of the item and the item's problem).

For this embodiment, the process remains generally the same as the embodiment described in connection with FIGS. 31A and 31B. However, when in the normal imaging mode (the set switch 28a being in its second position and the imaging trigger being depressed), as long as the imaging trigger 28 remains depressed frame after frame of compressed gray scale digital data is stored in the memory 311 for subsequent downloading via the serial output port 312 and/or forwarded to the radio module 314 for rf transmission to a remote device.

The steps of the process are the same as those described above with respect to the first operating embodiment and will not be repeated here. The difference between the two operating embodiments is found at step 436 in FIG. 32B. At step 436, the control and selection circuitry 284 continually checks to see if a signal has been received from the image capture trigger circuitry 28a indicating that the operator has released the imaging trigger 28. If such a signal from the image capture trigger circuitry 28a has been received, then at 438, the control and selection circuitry 284 energizes the orange color of the LED indicator 32 for a predetermined time period to signal the operator 105 that the images in the target area 44 during the depressing of the imaging trigger 28 have been successfully captured. Subsequently, the imaging assembly 18 is turned off.

If no signal is received from the image capture trigger circuitry 28a indicating that the operator has released the imaging trigger 28, then the process loops back to step 406 and successive image frames are captured, compressed and output to the serial output circuitry 296 until such time as the control and selection circuitry 284 receives the signal from the image capture trigger circuitry 28a indicating that the imaging trigger 28 has been released.

In this operating embodiment of the normal imaging mode, since the operator 105 continues to depress the imaging trigger 28 as long as image capture is desired, the voice capture module 304 has to be actuated in some other way. Here the operator must actuate the dataform reading trigger 26 during the imaging session if voice recordal is desired.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

I claim:

1. A dataform reader module for a portable data collection device, the dataform reader module comprising:
   a) a modular housing defining an internal region;
   b) a two dimensional imaging assembly including a two dimensional photosensor array supported within the housing internal region, the imaging assembly when actuated generating a composite video signal representative of successive frames of an image of a target area including a target object;
   c) an optics assembly supported by the modular housing for focusing an image of the target area including the target object onto the photosensor array; and
   d) the imaging assembly further including:
      i) signal processing circuitry receiving the composite video signal and converting a portion of the composite video signal corresponding to an image frame into a set of digital data representative of an image of the target area, the set of digital data including a plurality of digital data values corresponding to respective different image pixels of the imaged target area, each of the plurality of digital data values comprising a plurality of bits; and
      ii) image processing circuitry selectively actuatable to receive the set of digital data generated by the signal processing circuitry, the image processing circuitry including binarization and zoning circuitry to:
         convert selected digital data values in the plurality of digital data into a set of binary data values, a single bit binary data value being generated for each digital data value; and
         identify a subset of binary data values of the set of binary data values corresponding to an image of the target object; and
      iii) the image processing system processing the identified subset of binary data values to generate a set of output data.

2. The dataform reader module of claim 1 wherein the target object includes a dataform and the image processing circuitry further includes cell extraction and decoding circuitry selectively actuatable to operate on the identified subset of binary data values to generate decoded dataform data corresponding to the dataform.

3. The dataform reader module of claim 1 wherein the target object includes a signature area of a document and the image processing circuitry further includes compression circuitry selectively actuatable to operate on the identified subset of binary data values to generate compressed binary data corresponding to the signature area.

4. The dataform reader module of claim 1 wherein the imaging assembly further includes selection circuitry electrically coupled to the image processing circuitry, the selection circuitry including a dataform reading switch selectively actuated to energize the dataform recognition and decoding circuitry and an imaging switch selectively actuated to energize the signature area recognition and capture circuitry.

5. The dataform reader module of claim 4 wherein, upon actuation of the dataform reading switch, the selection circuitry first actuates the dataform recognition and decoding circuitry to select and decode an image of a dataform within a portion of a first image frame and subsequently actuates the signature area recognition and capture circuitry to select an image of a signature area within a second image frame.

6. The dataform reader module of claim 4 further including an illumination assembly supported by the modular housing and electrically coupled to the selection circuitry, the illumination assembly including targeting illuminators for aiming the module at a target and illumination illuminators for illuminating the target area, and wherein the selection circuitry alternately energizes the targeting illuminators and the illumination illuminators when the dataform recognition and decoding circuitry is actuated to read a dataform within the target area.

7. The dataform reader module of claim 4 wherein the selection circuitry energizes the exposure illuminators when the signature area recognition and capture circuitry is actuated to capture an image of a signature area within the target area.

8. The dataform reader module of claim 4 further including an illumination assembly supported by the modular housing and electrically coupled to the selection circuitry, the illumination assembly including targeting illuminators for aiming the module at a target and illumination illuminators for illuminating the target area, and wherein the selection circuitry alternately energizes the targeting illuminators and the illumination illuminators when the dataform recognition and decoding circuitry is actuated to read a dataform within the target area and subsequently deenergizes the targeting illuminators and energizes the illumination illuminators when the signature area recognition and capture circuitry is actuated to capture an image of a signature area within the target area.

9. The dataform reader module of claim 1 further including data compression circuitry electrically coupled to the image processing circuitry for compressing the image data corresponding to the image of the signature area.

10. A portable data collection device comprising:
    a) a housing defining and interior region;
    b) a dataform reader assembly at least partially supported within the housing interior region, the dataform reader assembly including:
       1) a two dimensional imaging assembly including a two dimensional photosensor array, the imaging assembly when actuated generating a composite video signal representative of successive frames of an image of a target area including a target object;
       2) an optics assembly for focusing an image of the target area including the target object onto the photosensor array; and 3) the imaging assembly further including:
  i) signal processing circuitry receiving the composite video signal and converting a portion of the composite video signal corresponding to an image frame into a set of digital data representative of an image of the target area, the set of digital data including a plurality of digital data values corresponding to respective different image pixels of the imaged target area, each of the plurality of digital data values comprising a plurality of bits; and
  ii) image processing circuitry selectively actuatable to receive the set of digital data generated by the signal processing circuitry, the image processing circuitry including binarization and zoning circuitry to:
    a) convert selected digital data values in the plurality of digital data into a set of binary data values, a single bit binary data value being generated for each digital data value; and
    b) identify a subset of binary data values of the set of binary data values corresponding to an image of the target object; and
    c) the image processing system processing the identified subset of binary data values to generate a set of output data.

11. The portable data collection device of claim 10 wherein the target object includes a dataform and the image processing circuitry further includes cell extraction and decoding circuitry selectively actuatable to operate on the identified subset of binary data values to generate decoded dataform data corresponding to the dataform.

12. The portable data collection device of claim 10 wherein the target object includes a signature area of a document and the image processing circuitry further includes compression circuitry selectively actuatable to operate on the identified subset of binary data values to generate compressed binary data corresponding to the signature area.

13. The portable data collection device of claim 10 wherein the imaging assembly further includes selection circuitry electrically coupled to the image processing circuitry, the selection circuitry including a dataform reading switch selectively actuated to energize the dataform recognition and decoding circuitry and an imaging switch selectively actuated to energize the signature area recognition and capture circuitry.

14. The portable data collection device of claim 13 wherein, upon actuation of the dataform reading switch, the selection circuitry first actuates the dataform recognition and decoding circuitry to select and decode an image of a dataform within a portion of a first image frame and subsequently actuates the signature area recognition and capture circuitry to select an image of a signature area within a second image frame.

15. The portable data collection device of claim 13 further including an illumination assembly supported by the modular housing and electrically coupled to the selection circuitry, the illumination assembly including targeting illuminators for aiming the module at a target and illumination illuminators for illuminating the target area, and wherein the selection circuitry alternately energizes the targeting illuminators and the illumination illuminators when the dataform recognition and decoding circuitry is actuated to read a dataform within the target area.

16. The portable data collection device of claim 13 wherein the selection circuitry energizes the exposure illuminators when the signature area recognition and capture circuitry is actuated to capture an image of a signature area within the target area.

17. The portable data collection device of claim 13 further including an illumination assembly supported by the modular housing and electrically coupled to the selection circuitry, the illumination assembly including targeting illuminators for aiming the module at a target and illumination illuminators for illuminating the target area, and wherein the selection circuitry alternately energizes the targeting illuminators and the illumination illuminators when the dataform recognition and decoding circuitry is actuated to read a dataform within the target area and subsequently deenergizes the targeting illuminators and energizes the illumination illuminators when the signature area recognition and capture circuitry is actuated to capture an image of a signature area within the target area.

18. The portable data collection device of claim 10 further including data compression circuitry electrically coupled to the image processing circuitry for compressing the image data corresponding to the image of the signature area.

* * * * *